US012713224B2

(12) United States Patent
Velev et al.

(10) Patent No.: US 12,713,224 B2
(45) Date of Patent: Aug. 18, 2026

(54) PROVIDING SUBSCRIPTION DATA OF AN EXTERNAL SUBSCRIBER

(71) Applicant: Lenovo (Singapore) Pte. Ltd., New Tech Park (SG)

(72) Inventors: Genadi Velev, Darmstadt (DE); Apostolis Salkintzis, Athens (GR); Sheeba Backia Mary Baskara Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 543 days.

(21) Appl. No.: 17/999,653

(22) PCT Filed: May 22, 2020

(86) PCT No.: PCT/EP2020/064328
§ 371 (c)(1),
(2) Date: Nov. 22, 2022

(87) PCT Pub. No.: WO2021/233554
PCT Pub. Date: Nov. 25, 2021

(65) Prior Publication Data
US 2023/0217241 A1 Jul. 6, 2023

(51) Int. Cl.
*H04W 8/20* (2009.01)

(52) U.S. Cl.
CPC .................................... *H04W 8/20* (2013.01)

(58) Field of Classification Search
CPC ...................................................... H04W 8/20
(Continued)

(56) References Cited

U.S. PATENT DOCUMENTS

2004/0132433 A1* 7/2004 Stern .................. H04M 3/4931 455/410
2008/0318551 A1* 12/2008 Palamara ............. H04W 8/265 455/411

(Continued)

OTHER PUBLICATIONS

PCT/EP2020/064328, "Notification of Transmittal of the International Search Report and the Written Opinion of the International Searching Authority, or the Declaration", International Searching Authority, Feb. 18, 2021, pp. 1-14.

(Continued)

*Primary Examiner* — Joel Ajayi
(74) *Attorney, Agent, or Firm* — Kunzler Needham Hilton

(57) ABSTRACT

Apparatuses, methods, and systems are disclosed for providing subscription data for an external subscriber. One apparatus includes a processor and a network interface that receives a registration request message from a remote unit and receives a subscription retrieval information. Here, the registration request message contains an external subscriber identifier and the subscription retrieval information is different than the external subscriber identifier of the remote unit. The processor controls the network interface to transmit to a network function in a mobile communication network a first request for subscription data retrieval using the subscription retrieval information and receive a response message from the network function that contains the UE subscription data. Here, the subscription retrieval information indicates that the subscription data is stored in a subscription owner outside the mobile communication network.

20 Claims, 13 Drawing Sheets

(58) Field of Classification Search
USPC ........................................................ 455/414.1
See application file for complete search history.

(56) References Cited

U.S. PATENT DOCUMENTS

| | | | | |
|---|---|---|---|---|
| 2010/0131973 | A1* | 5/2010 | Dillon | H04N 21/64322<br>725/120 |
| 2018/0227873 | A1* | 8/2018 | Vrzic | H04W 60/002 |

OTHER PUBLICATIONS

Qualcomm Incorported, Sennheiser, "3GPP TSG-SA WG2 Meeting #136-AH S2-2001527", Jan. 13, 2020-Jan. 17, 2020, pp. 1-6.

Motorola Mobility, Lenovo, "KI #1, New Sol: UE external subscription data stored in the SNPN", 3GPP TSG-SA WG2 Meeting #139E (e-meeting) S2-2004212, Jun. 1-12, 2020, pp. 1-7.

3GPP, "3rd Generation Partnership Project; Technical Specification Group Services and System Aspects; Study on enhanced support of non-public networks (Release 17)", 3GPP TR 23.700-07 V0.3.0, Jan. 2020, pp. 1-42.

3GPP, "3rd Generation Partnership Project; Technical Specification Group Services and System Aspects; System architecture for the 5G System (5GS) Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

* cited by examiner

Figure 5C:
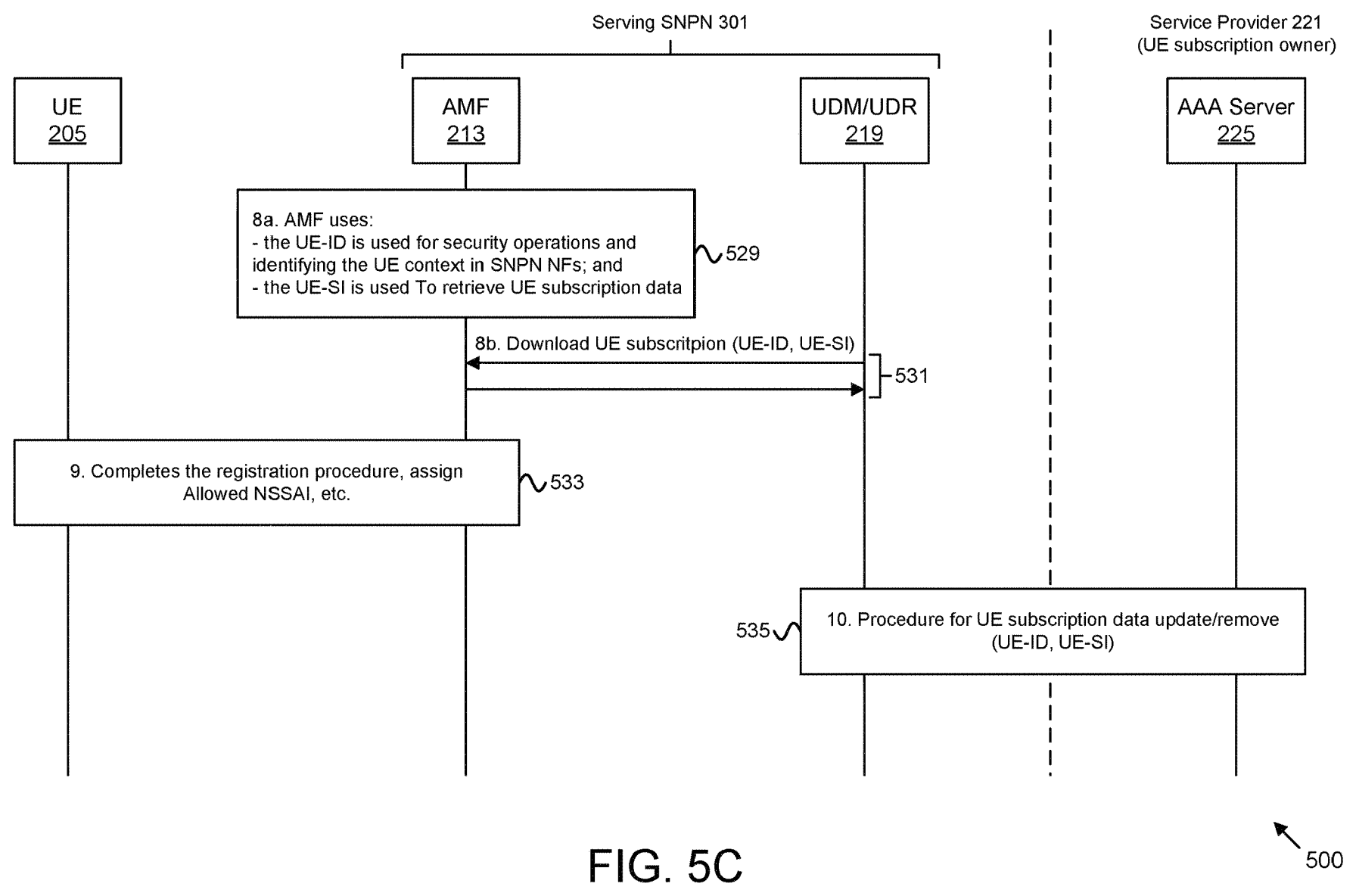

Serving SNPN 301

Service Provider 221 (UE subscription owner)

UE 205

AMF 213

UDM/UDR 219

AAA Server 225

8a. AMF uses:
- the UE-ID is used for security operations and identifying the UE context in SNPN NFs; and
- the UE-SI is used To retrieve UE subscription data

529

8b. Download UE subscritpion (UE-ID, UE-SI)

531

9. Completes the registration procedure, assign Allowed NSSAI, etc.

533

10. Procedure for UE subscription data update/remove (UE-ID, UE-SI)

PROVIDING SUBSCRIPTION DATA OF AN EXTERNAL SUBSCRIBER

The subject matter disclosed herein relates generally to wireless communications and more particularly relates to providing subscription data for an external subscriber.

BACKGROUND

The following abbreviations and acronyms are herewith defined, at least some of which are referred to within the following description.

Third Generation Partnership Project ("3GPP"), Fifth-Generation Core ("5GC"), Authentication, Authorization and Accounting ("AAA"), Access and Mobility Management Function ("AMF"), Access Point Name ("APN"), Access Stratum ("AS"), Aggregate Maximum Bitrate ("AMBR"), Application Programing Interface ("API"), Authentication Server Function ("AUSF"), Business Support System ("BSS"), Data Network Name ("DNN"), Downlink ("DL"), Enhanced Authentication Server Function ("eAUSF"), Enhanced Mobile Broadband ("eMBB"), Evolved Node-B ("eNB"), Evolved Packet Core ("EPC"), Evolved Packet System ("EPS"), Evolved UMTS Terrestrial Radio Access Network ("E-UTRAN"), Fully Qualified Domain Name ("FQDN"), Home Subscriber Server ("HSS"), Information Element ("IE"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Mobile Originated ("MO"), Mobile Terminated ("MT"), Non-Access Stratum ("NAS"), Narrowband ("NB"), Network Function ("NF"), Network Access Identifier ("NAI"), Network Exposure Function ("NEF"), Network Repository Function ("NRF"), Network Slice Secondary Authentication and Authorization ("NSSAA"), Network Slice Selection Assistance Information ("NSSAI"), Next Generation (e.g., 5G) Node-B ("gNB"), Next Generation Radio Access Network ("NG-RAN"), New Radio ("NR"), Non-Public Network ("NPN", i.e., a private network), Operation Administration and Management ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Subscription Concealed Identifier ("SUCI"), Subscription Permanent Identifier ("SUPI"), Subscriber Identity Module ("SIM"), Tracking Area Update ("TAU"), Transmission Control Protocol ("TCP"), Transmit ("Tx"), Unified Data Management ("UDM"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), Universal Subscriber Identity Module ("USIM"), User Datagram Protocol ("UDP"), Wireless Local Area Network ("WLAN"), and Worldwide Interoperability for Microwave Access ("WiMAX").

In certain embodiments, non-public networks ("NPN") are deployed to serve private (i.e., non-public) customers and/or service. A Standalone NPN ("SNPN") can be operated by an NPN operator and does not rely on network functions provided by a PLMN.

BRIEF SUMMARY

Methods for providing subscription data for an external subscriber are disclosed. Apparatuses and systems also perform the functions of the methods.

One method of a first network function, e.g., a UDM, for providing subscription data for an external subscriber includes receiving a request to provide a subscription data for an external subscriber from a network function. Here, the request contains at least one subscription retrieval parameter which indicates that the subscription data is stored in a subscription owner outside the mobile communication network. The method includes retrieving first subscription data from a subscription owner using the at least one subscription retrieval parameter and creating second subscription data using the first subscription data. The method includes generating a subscription identifier associated with the second subscription data and transmitting a response to the network function, the response comprising the second subscription data and the subscription identifier.

One method of a second network function, e.g., an AMF, for providing subscription data for an external subscriber includes receiving a registration request message from a remote unit (i.e., UE) and receiving a subscription retrieval information. Here, the registration request message contains an external subscriber identifier of the UE and the subscription retrieval information is different than the UE identifier. The method includes transmitting to a network function in a mobile communication network a first request for subscription data retrieval using the subscription retrieval information and receiving a response message from the network function that contains the UE subscription data. Here, the subscription retrieval information indicates that the subscription data is stored in a subscription owner outside the mobile communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5C is a continuation of the procedure depicted in FIGS. 5A-5B;

DETAILED DESCRIPTION

Figure 1:
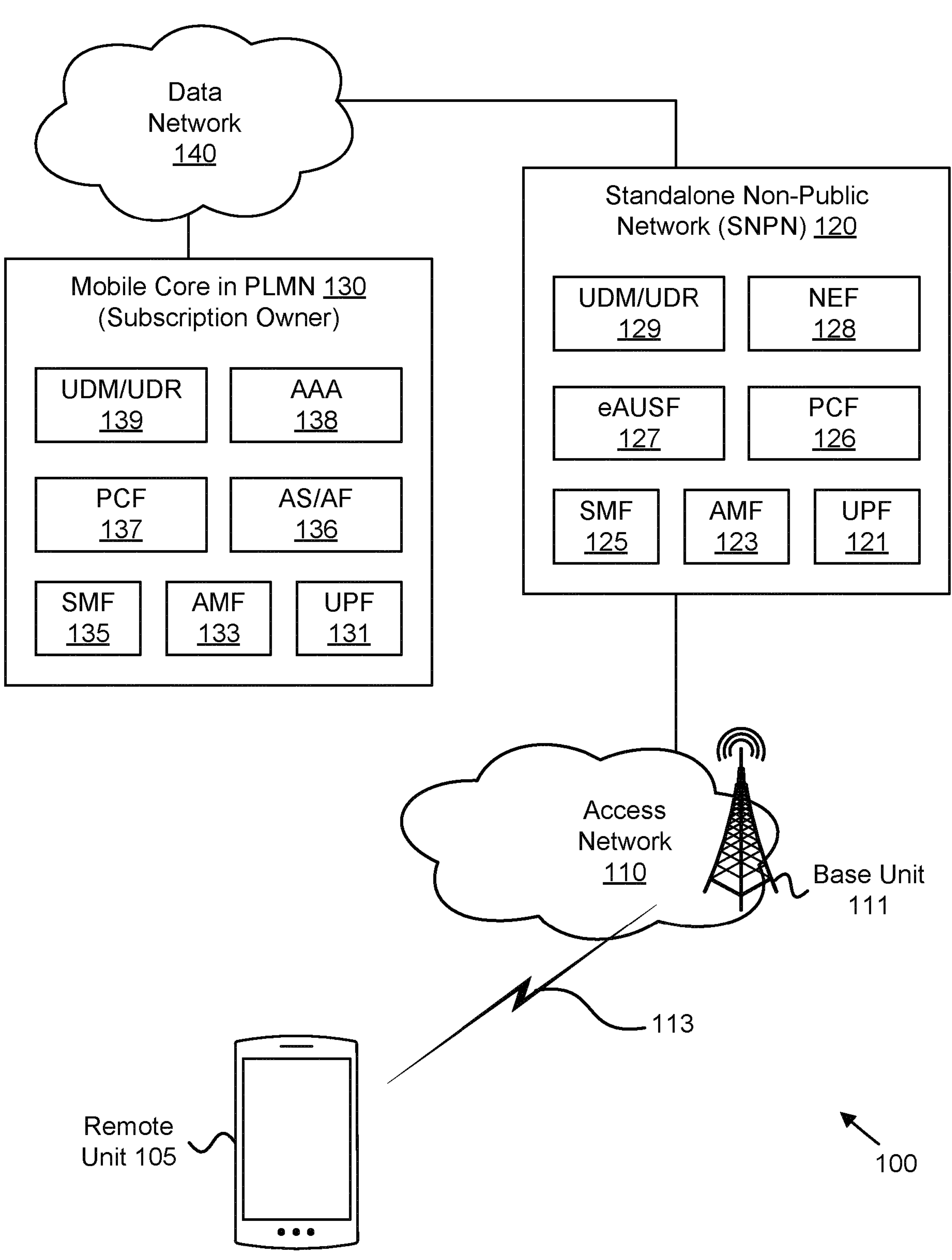
FIG. 1 is a diagram illustrating one embodiment of a wireless communication system for providing subscription data for an external subscriber.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for providing subscription data for an external subscriber. Non-public networks ("NPN") are networks according to the 5G system ("5GS") which are deployed to serve private (i.e., non-public) customers and/or service. An NPN can also offer a public service (public telephony service or emergency service), if the NPN has an agreement with a PLMN or an access to PSTN. An NPNs can be deployed in different ways, for example 1) either stand-alone ("SNPN") or 2) public network integrated ("PNI-NPN"). The SNPNs can be operated by an NPN operator and not relying on network functions provided by a PLMN. In contrast, the PNI-NPNs are deployed via a public land mobile network ("PLMN") by means of dedicated data network names ("DNNs"), or by one (or more) Network Slice instances allocated for the NPN. In case of PNI-NPN, the UE has a subscription for the PLMN. Usually a network customer can request the PLMN to setup a PNI-NPN to use specific customer service. The network customer is called "NPN customer" in this description.

The UE can have a default subscription for a network (e.g., PLMN) provisioned in the UE and in the network. With the default subscription, the UE may be able to register to the PLMN for some default services, but the UE would not be able to use the NPN customer services unless a service level agreement ("SLA") is in place between the PLMN and NPN.

When a UE roams into a visited network, the UE subscription is retrieved from the network functions (NFs) in the visited network from the home network. In case of PLMNs which are part of the roaming interconnection (e.g., IP exchange, IPX infrastructure), the NFs (AMF, SMF, etc.) contact the UDM in the home PLMN to retrieve the UE's subscription data. However, in case of private networks like SNPNs, the roaming interconnection is not available. Therefore, the problem needs to be addressed of how to provide UE's subscription data to the Serving SNPN and the relevant NFs (e.g., AMF, SMF and PCF).

In case the UE subscription owner does not support roaming interfaces and UDM/AUSF functionality, there is currently no solution specified for how to provide UE's subscription data to the visited network (e.g., SNPN) and the relevant NFs (e.g., AMF, SMF and PCF). The AMF cannot complete the Registration procedure without AM subscription data. The PCF also need to obtain the UE subscription from the UDR to derive the UE policy or configuration. After registration, during PDU Session establishment procedure, the AMF and SMF also need to corresponding AM/SM subscription data in order to process the UE request.

Figure 2:
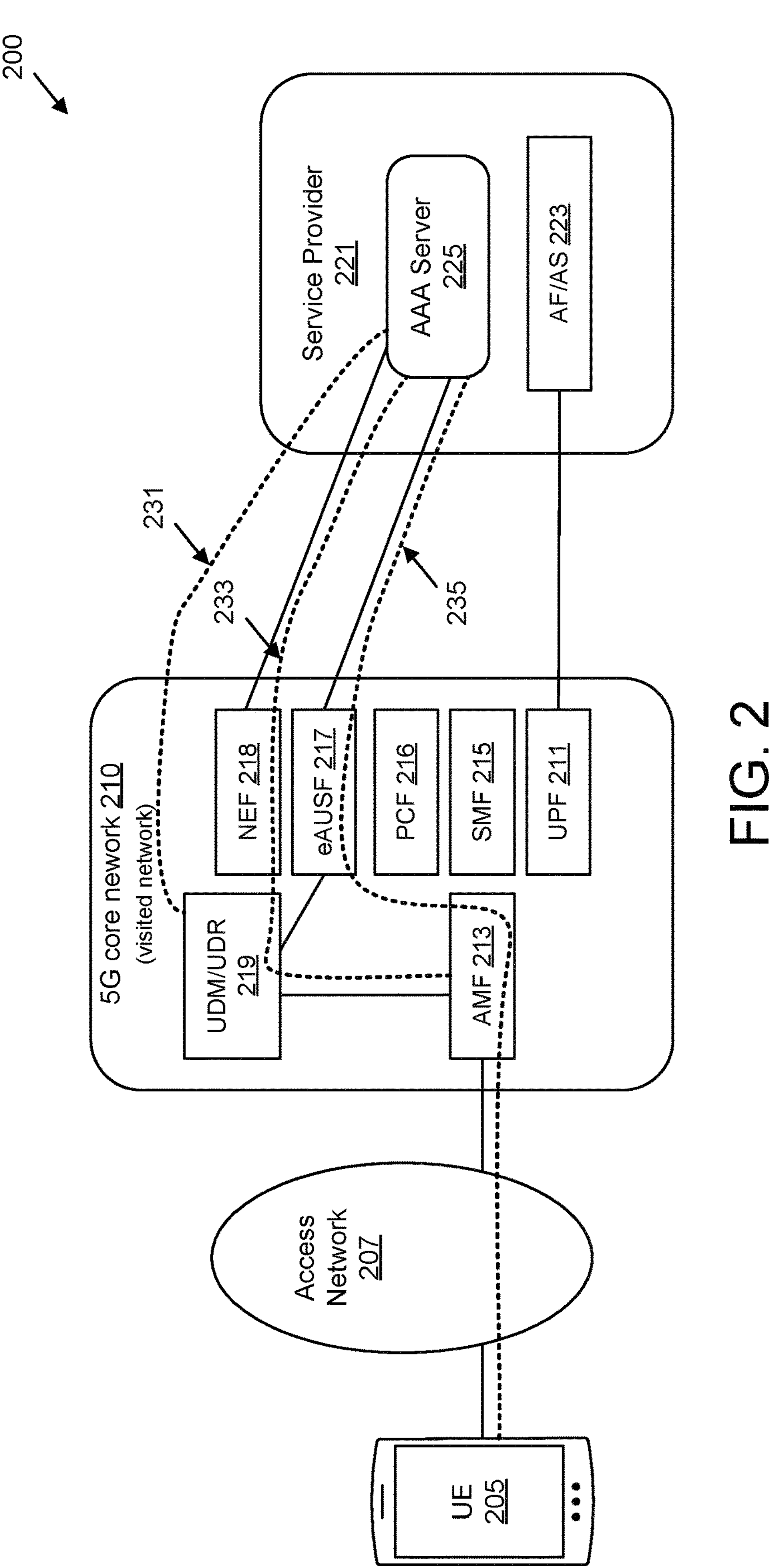
FIG. 2 is a diagram illustrating one embodiment of a network deployment for providing subscription data for an external subscriber.

The architecture assumed for this solution is shown in FIGS. 1-2. The UE selects and initiates a registration with SNPN, whereas the UE's subscription data is stored in 3rd party Subscription Owner domain. Please note that in this document the Subscription Owner ("SO") is also described as Service Provider ("SP") and both terms may be used inter-changeably. The SO or SP is shown as PLMN in the left-hand side of the FIG. 1. It is however possible that the SP (which may be represented with the Application Server, AS, or Application Function, AF) can be independent entity from the SO (which can be represented by the AAA infrastructure including AAA server). The AAA server (or other entities storing UE credentials) may also store the UE service subscription, i.e., the services (and descriptive information like type, bitrate, spending allowance, etc.) which are subscribed for the UE. This latter deployment case where the SO has AAA infrastructure (i.e., not PLMN nor SNPN) is shown in the right-hand side of the FIG. 2.

FIG. 1 depicts a wireless communication system 100 for registering with a mobile network through another mobile network, according to embodiments of the disclosure. In one embodiment, the wireless communication system 100 includes at least one remote unit 105, at least one access network 110 (each access network comprising at least one base unit 111), a standalone non-public network ("SNPN") 120, and a mobile core network 130 in a PLMN. The access network 110 may be composed of at least one base unit 111. The remote unit 105 may communicate with the access network 110 using 3GPP communication links and/or non-3GPP communication links, according to a radio access technology deployed by the access network 110. Even though a specific number of remote units 105, access networks 110, base units 111, SNPN 120 and mobile core networks 130 are depicted in FIG. 1, one of skill in the art will recognize that any number of remote units 105, access networks 110, base units 111, SNPN 120, and mobile core networks 130 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote unit 105 may be referred to as UE, subscriber unit, mobile, mobile station, user, terminal, mobile terminal, fixed terminal, subscriber station, user terminal, wireless transmit/receive unit ("WTRU"), a device, or by other terminology used in the art.

The remote units 105 may communicate directly with one or more of the base units 111 in the access network 110 via uplink ("UL") and downlink ("DL") communication signals. Furthermore, the UL and DL communication signals may be carried over the communication links 113. Note, that the access network 110 is an intermediate network that provide the remote units 105 with access to the SNPN 120 and/or mobile core network 130.

In some embodiments, the remote units 105 communicate with an application server (or other communication peer) via a network connection with the SNPN 120 and/or mobile core network 130. For example, an application in a remote unit 105 (e.g., web browser, media client, telephone/VoIP application) may trigger the remote unit 105 to establish a PDU session (or other data connection) with the SNPN 120 using the access network 110. The SNPN 120 then relays traffic between the remote unit 105 and the, e.g., application server (in the data network 140) using the PDU session. Note that the remote unit 105 may establish one or more PDU sessions (or other data connections) with the SNPN 120. As such, the remote unit 105 may have at least one PDU session for communicating with the data network 140. The remote unit 105 may establish additional PDU sessions for communicating with other data network and/or other communication peers.

As discussed in further detail below, a signaling connection of a remote unit 105 with the SNPN 120 may be used to register the remote unit 105 with the SNPN 120. Specifically, a remote unit 105 having a subscription (or other account) with the mobile core network 130 may register with the SNPN 120 using the signaling connection in order to use a service in the SNPN 120, as described in further detail below. In the depicted embodiment, the SNPN 120 is a visited network for the remote unit 105 and the mobile core network 130 is a home network for the remote unit 105.

The base units 111 may be distributed over a geographic region. In certain embodiments, a base unit 111 may also be referred to as an access terminal, an access point, a base, a base station, a Node-B, an eNB, a gNB, a Home Node-B, a relay node, a device, or by any other terminology used in the art. The base units 111 are generally part of a radio access network ("RAN"), such as the access network 110, that may include one or more controllers communicably coupled to one or more corresponding base units 111. These and other elements of radio access network are not illustrated but are well known generally by those having ordinary skill in the art. The base units 111 connect to the SNPN 120 and mobile core network 130 via the access network 110.

The base units 111 may serve a number of remote units 105 within a serving area, for example, a cell or a cell sector, via a communication link 113. The base units 111 may communicate directly with one or more of the remote units 105 via communication signals. Generally, the base units 111 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 111.

In one embodiment, the SNPN 120 contains a 5G core ("5GC") or a evolved packet core ("EPC"), which may be coupled to a data network (e.g., the data network 140, such as the Internet and private data networks, among other data networks). As depicted, the SNPN 120 includes several network functions ("NFs"). The SNPN 120 includes at least one user plane function ("UPF") 121 that serves the access network 110. The SNPN 120 also includes multiple control plane functions including, but not limited to, an Access and Mobility Management Function ("AMP") 123, a Session Management Function ("SMF") 125, a Policy Control Function ("PCF") 126, an enhanced Authentication Server Function ("eAUSF") 127, a Network Exposure Function 128, and a Unified Data Management/Unified Data Repository ("UDM/UDR") 129. Please note that the UDM and UDR may be implemented in independent network functions with a standardized interface allowing signaling exchange between them, but for simplicity it is assumed herewith that they are co-located. In certain embodiments, the mobile core network 130 may also include a Network Repository Function ("NRF") (used by the various NFs to discover and communicate with each other over APIs), or other NFs defined for the 5GC. Although specific numbers and types of network functions are depicted in FIG. 1, one of skill in the art will recognize that any number and type of network functions may be included in the SNPN 120.

In various embodiments, the SNPN 120 has a service level agreement with the mobile core network. As such, the SNPN 120 may act as an authentication proxy for a remote unit 105 having a subscription with the mobile core network 130, as discussed in further detail with reference to FIGS. 2, 3A, 4A, and 5A. Additionally, the SNPN 120 may receive subscription data for the remote unit 105 (an external subscriber) from the mobile core network 130, as discussed in further detail with reference to FIGS. 2, 3B, 4B, and 5B.

In one embodiment, the mobile core networks 130 is a 5G core ("5GC") or a evolved packet core ("EPC"), which may be coupled to a data network (e.g., the data network 140, such as the Internet and private data networks, among other data networks). The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 110. The mobile core network 130 also includes multiple control plane functions including, but not limited to, an Access and Mobility Management Function ("AMF") 133, a Session Management Function ("SMF") 135, an Application Server/Application Function ("AS/AF") 136, a Policy Control Function ("PCF") 137, an AAA server 138, and a Unified Data Management/Unified Data Repository ("UDM/UDR") 139. In certain embodiments, the mobile core network 130 may also include a NEF, an AUSF, an NRF, or other NFs defined for the 5GC. Although specific numbers and types of network functions are depicted in FIG. 1, one of skill in the art will recognize that any number and type of network functions may be included in the mobile core network 130.

In various embodiments, the SNPN 120 and/or mobile core network 130 support different types of mobile data connections and different types of network slices, wherein each mobile data connection utilizes a specific network slice. Here, a "network slice" refers to a portion of the mobile core network 140 optimized for a certain traffic type or communication service. A network slice instance may be identified by a S-NSSAI, while a set of network slices for which the remote unit 105 is authorized to use is identified by NSSAI.

Each network slice includes a set of CP and UP network functions, wherein each network slice is optimized for a specific type of service or traffic class. In certain embodiments, the various network slices may include separate instances of network functions. In some embodiments, the different network slices may share some common network functions. In one example, each network slice may include a dedicated SMF, PCF for SMF and a UPF, with the various network slices in the PLMN/SNPN sharing an AMF, PCF for AMF, and UDM. In another example, each network slice may include a dedicated AMF, PCF(s), SMF and UPF. The different network slices are not shown in FIG. 1 for ease of illustration, but their support is assumed.

FIG. 2 depicts a network deployment 200 comprising a UE 205 which connects to an access network 207 an attempts to register with a visited network, the 5G core network ("5GC") 210, which is one embodiment of the SNPN 120. Here, the UE 205 does not have a subscription (or other account) with the 5GC 210, but instead has a subscription (or other account) with the service provider 221, which is one embodiment of the mobile core network 130. FIG. 2 represents a simplified deployment of the wireless communication system 100, where the UE 205 is one embodiment of the remote unit 105.

According to one solution, the UE subscription data is stored (on-demand/temporary or pre-provisioned/long-term) in the SNPN's domain, e.g., in UDM/UDR 219 of the 5GC 210. Here, the UDM/UDR 219 is one embodiment of the UDM/UDR 129. The UDM/UDR 219 can be a known UDM/UDR, but it can be a specific UDM/UDR providing additional functionality for serving external subscribers like disclosed in this document (e.g., providing mapping of external (service) subscription data to subscription data to be used in the SNPN; support handling of subscription retrieval parameter; support of signaling exchange with external AAA server, etc.). The benefit of such solution is that all NFs in the 5GC 210 (i.e., visited SNPN) can use the UE subscription as if the SNPN were the home SNPN. The paths 231 and 233 shows the signaling flow exchange for the UE subscription data provisioning in the SNPN's UDM/UDR 219. The signaling flow can be direct between UDM/UDR 219 and AAA server 225 (path 231) or traversing the NEF 218 (path 233). Alternatively, the signaling flow between UDM/UDR 219 and AAA server 225 may traverses the eAUSF 217. The benefit of the latter alternative is that the eAUSF 217 may already provide connectivity to the AAA server 225, e.g., for the UE primary authentication and authorization, so such connectivity can be re-used.

The path 235 shows the signaling flow exchange for the primary network access authentication and authorization. The eAUSF 217 can be a known AUSF function, but can be also considered as enhanced AUSF implementing additional functionality (e.g., AAA proxy functionality), or it can be a stand-alone function implementing AAA message routing or providing transport layer security for the AAA messages between the SNPN (5GC 210) and the AAA server 225. The benefit of independent eAUSF function would be that the security signaling exchange for external subscribers (e.g., UE 105 or 205) is separated from the signaling for the SNPN own subscribers, which may use the known AUSF function. Note that the AAA messaging may conform with any Diameter, Radius, or other AAA protocol.

The service provider 221 is a subscription owner (SO) of the UE 205. The service provider 221 stores a service subscription information which may or may not be used as is in the visited network (e.g., SNPN/5GC 210) which deploys 5GS. Therefore, the 5GC 210 may use the service subscription information to generate subscription data for the UE 205. The mapping of service subscription information to subscription data can be performed by implementation means in the UDM/UDR 219, or the UDM may use support from a BSS (business support system) in the SNPN, or support from the OAM (operations, administration and management) system of the SNPN, or by other means. The mapping rules/guidelines of service subscription information to subscription data can be part of the service level agreement between the SNPN and the SO.

Figure 3A:
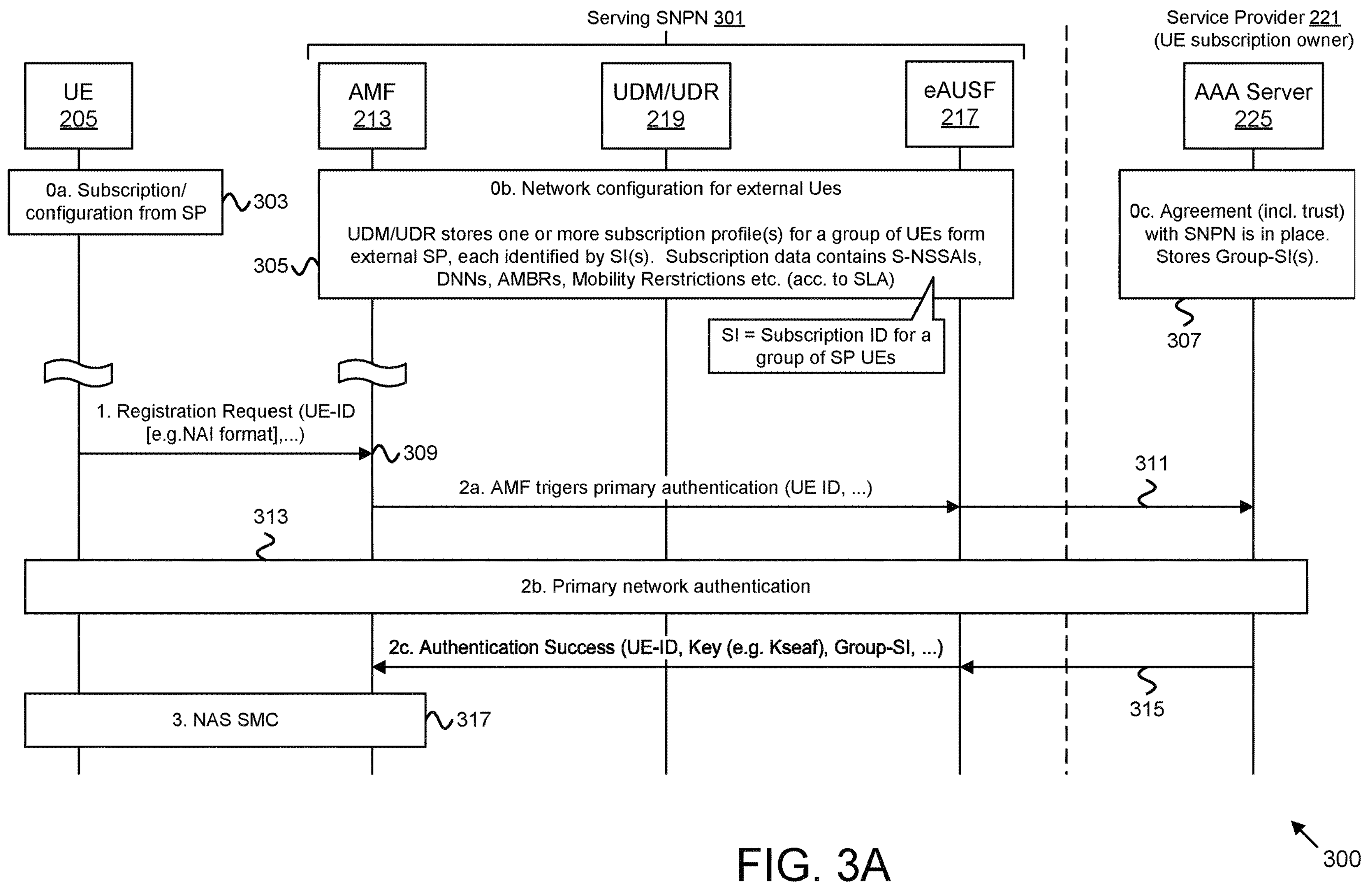
FIG. 3A is a signal flow diagram illustrating one embodiment of signaling flow for provisioning of external (group) subscription to Serving SNPN.
Figure 3B:
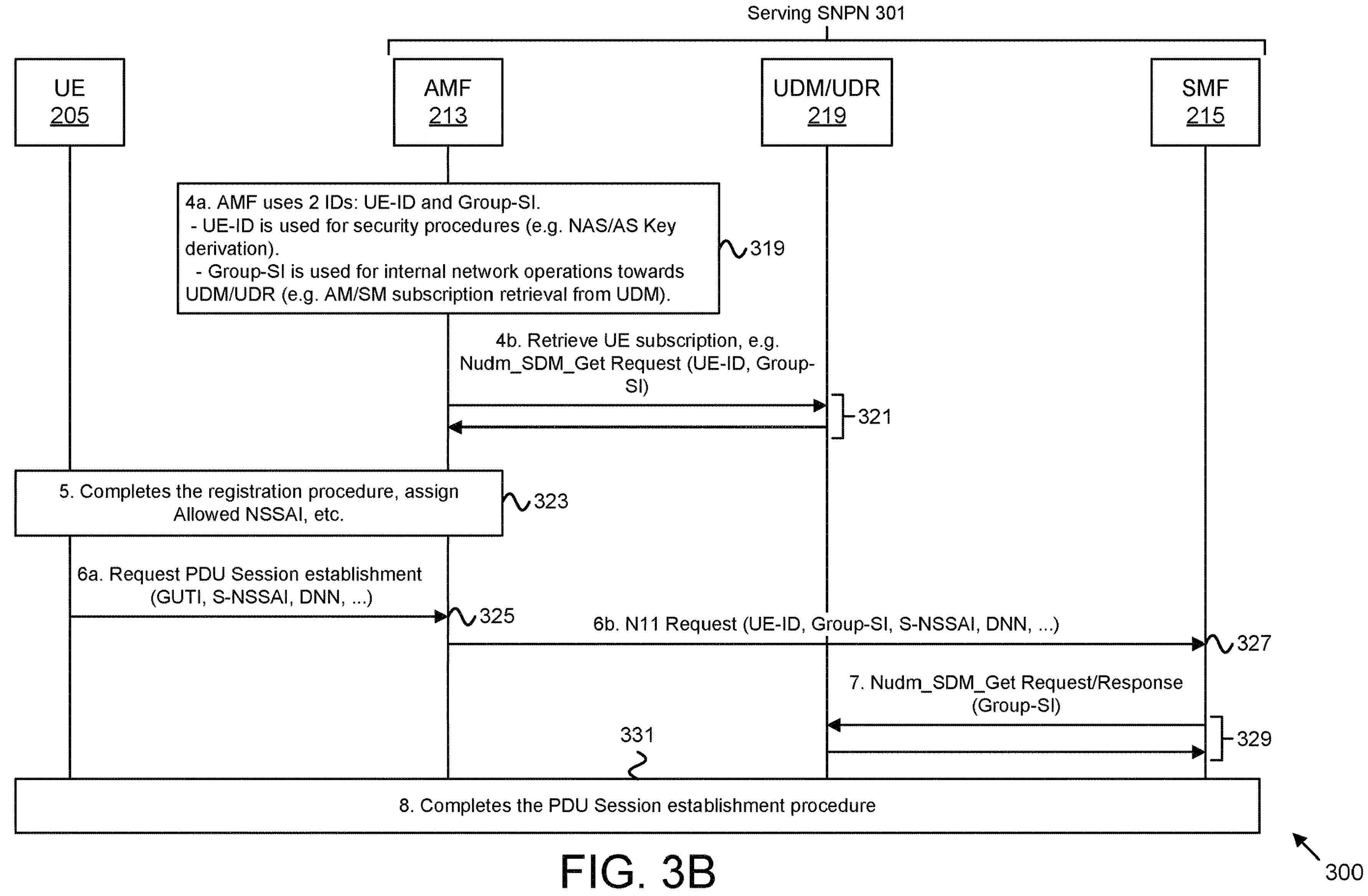
FIG. 3B is a continuation of the procedure depicted in FIG. 3A.

The subscription data for the UE 205 is either a) pre-provisioned in the SNPN/5GC 210, orb) provisioned on-demand to the SNPN/5GC 210. FIG. 3A-3B describe solutions where the subscription data is pre-provisioned in the SNPN. FIGS. 4A-4C and 5A-5C describe solutions where the subscription data is provisioned on-demand to the SNPN. It can be noted that the UE subscription data stored in the SNPN (e.g., UDM/UDR 219) does not include the security-related data, e.g., UE Keys (symmetrical keys) which are stored in the SO domain (e.g., AAA server). The UE subscription data stored in the SNPN may be like the data structure as known from the specification 3GPP TS23.502.

The UDM/UDR 219 generates a UE subscription identifier (SI) for the provisioned subscription data. This (generated) SI may be different than an (external) SI used by the service provider 221. In various embodiments, the generated SI is sent to the AMF 213 and used internally in the SNPN/5GC 210 while the UE 205 is served by the visited SNPN/5GC 210. Note that the SI is different than the UE-ID (i.e., SUPI/SUCI resulting from the Registration Request message) of the UE 205.

The AMF 213 uses both UE identities (i.e., the UE-ID and the SI) in the 5GC 210 as follows: The UE-ID is used for security procedures (e.g., key derivation in the AMF 213, signaling exchange with the eAUSF 217 or AAA server 225). The UE-SI is used for subscription data retrieval from the UDM/UDR 219. The AMF 213 receives the SI from either a) the AAA-server during the authentication procedure, or b) from the UDM during the subscription retrieval procedure. The AMF 213 populates the SI to the other NFs (SMFs, PCF, etc.) during various procedures.

FIGS. 3A-3B depict a procedure 300 for registering a UE 205 with a visited SNPN, according to embodiments of the disclosure. The procedure 300 involves the UE 205 (e.g., one embodiment of the remote unit 105), a serving SNPN 301 comprising the AMF 213, the UDM/UDR 219, the eAUSF 217, and the AAA server 225 in the service provider network (i.e., the UE subscription owner). The procedure 300 represents a first solution for providing subscription data for an external subscriber and details signaling flow for how the UE 205 may register and establish a data connection (e.g., a PDU session, as depicted) with the SNPN 301 using the pre-provisioned subscription data.

The procedure 300 assumes that the Serving SNPN 301 and the SP 221 have setup an SLA. The Serving SNPN 301 may generate and store one or more subscription profiles for different groups of SP UEs (having same or similar service subscription parameters in the SP/SO). The SNPN 301 creates a subscription identifier (SI or Group SI) associated with the subscription data and sends the (generated) SI to the SP 221.

Upon registration procedure, the AMF 213 triggers the primary authentication for network access using the concealed UE-ID provided by the UE 205. After successful authentication, the SP AAA-server 225 provides the deconcealed UE-ID and the (Group) subscription ID (Group-SI) to the Serving SNPN 301 (e.g., to the AMF 213). The AMF 213 and other NFs uses the Group-SI as identifier to retrieve the subscription data from UDM/UDR 219. Note that the AMF 213 may send both the UE-ID and Group-SI to other NFs for establishing UE context.

Referring to FIG. 3A, the procedure 300 begins at step 0a where the UE 205 has a subscription with service provider (SP) 221 (see block 303). The subscription is identified by a UE-ID. The UE-ID may include the identity of the SP 221, as described in step 1.

At step 0b, the SNPN 301 stores one or more subscription data sets for different groups of UEs, which are SP subscribers (see block 305). The subscription data set is generated and stored based on the SLA with the SP 221 and may contain the typical subscription parameters like Mobility Restrictions, S-NSSAI(s), DNN(s), AMBR(s), etc. In one embodiment, the subscription data set does not contain security parameters (e.g., Key material for the UE or group of UEs). Each subscription data/profile/set is associated with a unique subscription identifier (SI). The SI can be generated internally by the SNPN 301.

For example, the SP 221 may have several types of subscribers/UEs, which are allowed to use different SP services or allowed to have different types of network connectivity service. Some of the SP UEs may be allowed to use URLLC services and others massive IoT services. In such case, the SP may request multiple service or connection types to the SNPN 301, which would result in the creation of multiple subscription data profiles/sets (e.g., subscription types) in the SNPN 301. The SNPN 301 would assign an SI (i.e., Group-SI) for each of the subscription data profiles/sets.

At step 0c, the SI is provided to the SP 221 (see block 307). The exchange with the SP 221 can happen either during the SLA negotiation or via other signaling means. The SP 221 is made aware about the subscription type in the SNPN 301 which is identified by the SI. The SP 221 may associate a specific UE (service) subscription with the SI received from the SNPN 301. The SP 221 may have contract with multiple SNPNs, and the SP 221 may maintain multiple SIs from different SNPNs for the same (service) subscription in the SP/SO. Further, the SI is also used as Group-SI, as the subscription data set in the UDM/UDR 219 can be applied to one or multiple UEs from the SP 221. Please note that the format of the SI may be the same for group SI and individual SI, i.e., the SI format itself does not reveal whether one or multiple subscriptions are identified by the SI. However, it is also possible that SI may have a different format for group SI and individual SI, e.g., there may be a special bit/flag in the SI string indicating whether the SI is for a group or individual subscriptions. In one example, the SI may have the format of SUPI or IMSI.

At step 1, the UE 205 selects the SNPN 301 as suitable serving network and sends Registration Request message (see messaging 309). The UE 205 includes its UE identifier (UE-ID). For example, the UE-ID can be in form of NAI, where the "realm"-part of the NAI identifies the UE's subscription owner ("SO"), i.e., the SP 221. As such, this UE-ID is a subscriber identity for the SP 221 (i.e., external subscriber identity), an external network from the perspective of the SNPN 301.

At step 2a, the AMF 213 triggers the primary network authentication procedure for network access (see messaging 311). The AMF 213 may select a specific AUSF (e.g., eAUSF 217) in the SNPN 301 based on the SO identifier (SO-ID or service provider ID, SP-ID) which is derived from the UE-ID. For example, if the "realm" part of the UE-ID indicates a SO-ID which is not PLMN ID or SNPN ID, the AMF 213 is permitted to select the eAUSF 217 in its own network to send the authentication request. The AMF 213 may be pre-configured with the eAUSF ID or the AMF 213 may discover the eAUSF ID via the NRF functionality. The AMF 213 may use the service based interface (SBI) request/response exchange with the eAUSF 217. The eAUSF 217 may generate AAA message towards the AAA server 225. The AAA message sent in this step has the target of the AAA server 225 derived from the SO-ID. The eAUSF 217 may have transport layer security setup in order to securely exchange AAA message signaling with the AAA server 225. The eAUSF 217 may map the AAA server ID in form of SO-ID into an IP address of the AAA server 225. The eAUSF 217 may be pre-configured with the AAA serve 225 address or the eAUSF 217 may discover the AAA server IP address using the SO-ID and constructing an FQDN.

At step 2b, the UE 205 is authenticated by the AAA server 225 (see block 313). Any EAP authentication method may be used. At step 2c, after the EAP authentication is completed, the AAA server 225 sends the authentication result (Success or Failure) to the eAUSF 217 and AMF 213 (see messaging 315). In case of Authentication result is successful, the message may also contain at least one of the following parameters: UE-ID (identifying the UE at the SO/SP), Key material (e.g., Kseaf for deriving further keys for NAS layer or AS layer), a Group-SI (used to identify the UE subscription data in the serving SNPN 301).

The Group-SI may be formatted in a way to indicate that this is a group ID, so that the AMF 213 knows to include an additional individual (unique) UE identifier in the interaction with the NFs in the SNPN 301. The additional unique UE identifier would be used as an identifier for the UE context in the different NFs, whereas the Group-SI is used as subscription identifier mainly towards the UDM/UDR 219. Please note that in another embodiment the Group SI may not be used and instead an indication is sent to the AMF 213 to indicate that the (external) UE-ID can be used also for identification of the UE subscription data in the SNPN 301 (e.g., UDM/UDR 219, SMF 215). In such cases the AMF 213 uses the UE-ID (although based on external subscription identity in SO/SP) in the signaling towards UDM/UDR 219 and other NFs within the SNPN 301. The signaling messages within SNPN 301 may include an additional flag/parameter indicating that the signaling messages containing the (external) UE-ID should be routed internally in the SNPN 301. The signaling routing infrastructure in the SNPN 301 is correspondingly configured to correctly route the signaling message and discover the correct UE subscription data.

In case of authentication failure indicated from the AAA server 225, the AMF 213 would complete the registration procedure by sending Registration Reject message to the UE 205 with an appropriate reject cause. The AAA server 225 may not send the Group-SI to the AMF 213, as it is not needed in the AMF 213 in failure case.

At step 3, the AMF 213 performs NAS security mode command (SMC) with the UE 205 to setup the NAS security with the UE 205 (see block 317). The AMF 213 uses the Key material received in step 2c to derive the further security keys, e.g., NAS key and AS/gNB keys.

Continuing on FIG. 3B, at step 4a, the AMF 213 uses two identifiers for the UE 205: the UE-ID and the Group-SI (see block 319). The identifiers are used for different purposes. The Group-SI is used for internal network operations to retrieve subscription data from UDM/UDR 219 (e.g., AM/SM subscription retrieval from UDM/UDR 219). Any NF which needs to contact the UDM/UDR 219 for subscription data download has to use the Group-SI.

The UE-ID is used for security procedures, e.g., deriving of (NAS or AS) security keys for the UE 205, communication towards the eAUSF 217 during (re-)authentication/authorization procedure. Further, the UE-ID is used to uniquely to identify UE context in the SNPN 301's NFs (e.g., AMF 213, SMF 215, UDM/UDR 219, PCF 216, etc.).

Even though the UE-ID is from an external SP/SO domain, the AMF 213 determines to select and contact a UDM/UDR 219 in its own network (SNPN 301). This is a new feature of the AMF 213 to perform a selection of UDM/UDR 219 in the SNPN 301 despite the network identifier (e.g., "realm" part of the UE-ID, in NAI format) targeting to an external network. In one embodiment, the UDM/UDR 219 is a specific UDM instance deployed for UEs from external SPs. For the purpose of UDM selection in the AMF 213, one of the following may be used: 1) the AMF 213 may be pre-configured with the UDM ID supporting maintenance of subscription data for external subscribers, or 2) the AMF 213 requests the NRF to resolve the UDM ID by using a new parameter, e.g., the "realm" part of the UE-ID.

At step 4b, the AMF 213 selects a UDM/UDR 219 as per step 4a. The AMF 213 may register with the UDM/UDR 219 using Nudm_UECM_Registration for the access to be registered (and subscribes to be notified when the UDM/UDR 219 deregisters this AMF 213) using the UE-ID. The AMF 213 retrieves the subscription data of the UE 205 from the UDM/UDR 219, e.g., access and mobility (AM) subscription data, SMF Selection Subscription data, UE context in SMF data and LCS mobile origination subscription (see messaging 321). The AMF 213 uses the Group-SI as a subscription identifier for this UE 205 towards the UDM/UDR 219, whereas the UE-ID used to identify the UE 205 in the UDM/UDR 219 for the UE-context (not to identify the UE subscription data).

For example, the AMF 213 can use Nudm_SDM_Get Request with parameters [UE-ID, Group-SI, <other parameters>] to retrieve the UE subscription data. The UE-ID is used to uniquely identify the UE context created in the UDM/UDR 219, e.g., the UDM/UDR 219 needs to store serving AMF ID and other information for this UE 205.

Please note that according to the embodiment described in step 2c where the Group SI is not used but instead the indication that the (external) UE-ID can be used also for identification of the UE subscription data in the SNPN 301, the AMF 213 uses in the step 4b this indication together with the (external) UE-ID in the signaling towards UDM/UDR 219.

At step 5, the AMF 213 completes the registration procedure, e.g., as per 3GPP specification TS 23.502 (see block 323). For this purpose, the AMF 213 derives the parameters to be included in the Registration Accept message, e.g., Allowed NSSAI, Mobility Restrictions, etc.

At step 6a, the UE 205 may request PDU Session establishment for a particular S-NSSAI (see messaging 325). At step 6b, the AMF 213 selects an appropriate SMF 215 based on the stored UE context and the S-NSSAI or DNN (if any) requested by the UE 205 in step 6a. In the N11 message to the SMF 215, the AMF 213 includes an additional information of the Group-SI (see messaging 327).

For example, the AMF 213 may use the service operation Nsmf_PDUSession_CreateSMContext Request with parameters: [SUPI, Group-SI, selected DNN, UE-requested DNN, S-NSSAI(s), PDU Session ID, <other parameters>]. Alternatively, the AMF 213 may use the service operation Nsmf_PDUSession_UpdateSMContext Request with parameters: [SUPI, DNN, S-NSSAI(s), SM Context ID, <other parameter>]. The SUPI would be the UE-ID, discussed above, and the Group-SI would be the new parameter to be used in the SMF 215 to request the UE subscription data (e.g., from UDM/UDR 219). The SMF 215 needs to uniquely identify the UE context, as the SMF 215 subscribes for notifications from AMF 213.

At step 7, the SMF 215 uses the Group-SI to retrieve the UE's Session Management (SM) subscription data from the UDM/UDR 219 (see messaging 329). The UE-ID is used in the SMF 215 to uniquely identify the UE context. Please note that according to the embodiment described in step 2c where the Group SI is not used but instead the indication that the (external) UE-ID can be used also for identification of the UE subscription data in the SNPN 301, the SMF 215 uses in the step 7 this indication together with the (external) UE-ID in the signaling towards UDM/UDR 219.

For example, the SMF 215 may use the service operation Nudm_SDM_Get with parameters: [SUPI, Group-ID, Session Management Subscription data, <other parameters>]. The SUPI would be the UE-ID, discussed above, and the Group-SI would be the new parameter to be used by the SMF 215 to request the UE subscription data (e.g., from UDM/UDR 219). If the SMF 215 needs to request SM policy from PCF, then the SMF 215 includes an additional information of the Group-SI to the PCF. The PCF would use the Group-SI to request UE's subscription data from the UDM/UDR 219.

At step 8, the SMF 215 completes the PDU Session establishment procedure with the UE 205 (see block 331). If the UE 205 is assigned to use more than one network slice in the SNPN 301, i.e., the Allowed NSSAI in the Registration Accept message contains 2 or more S-NSSAIs, then it is recommended that the SNPN generates and sends URSP rules (meant as Network Slice Selection Policy ("NSSP") rules) to the UE. This can be performed by the PCF for AM policies selected by the AMF. The PCF uses the subscription data received from the UDR to create the URSP rules.

The benefit of this first solution is that the UE-specific signaling exchange between the SNPN 301 and the SP 221 is reduced to the UE (primary) authentication and authorization procedure. Once the primary authentication is successfully completed, the SNPN 301 can serve the UE 205 without further interaction with the SP 221. However, in the first solution the UE subscription data cannot be changed dynamically if the service subscription in the SP 221 changes. If the service subscription changes, the SP/SO 221 needs to re-negotiate or update SLA with the SNPN 301. FIGS. 4A-4C and 5A-5C describe solutions allowing dynamic change of subscription data in the SNPN 301.

Figure 4A:
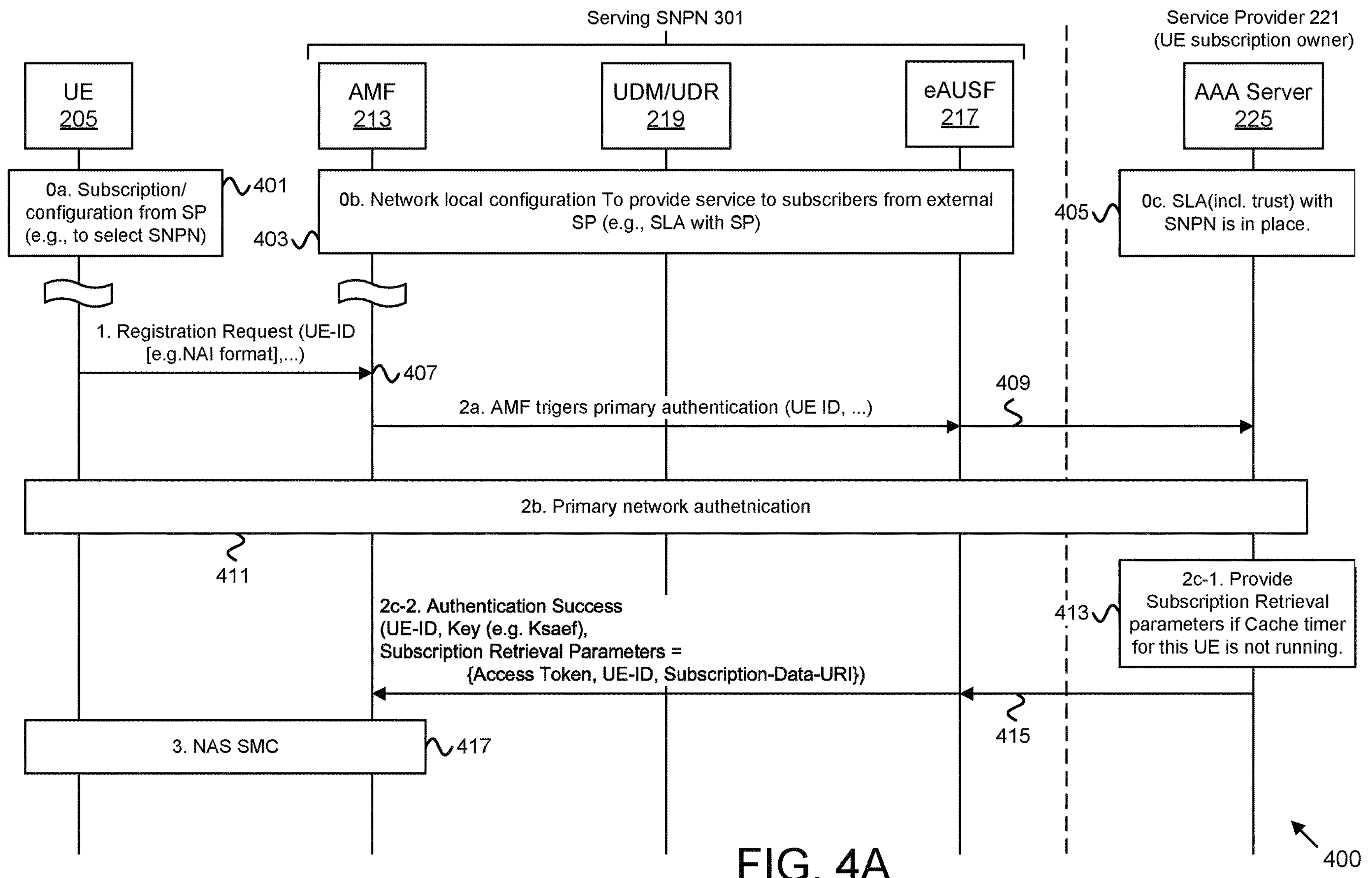
FIG. 4A is a signal flow diagram illustrating one embodiment of signaling flow for on-demand provisioning of external subscription to Serving SNPN.
Figure 4B:
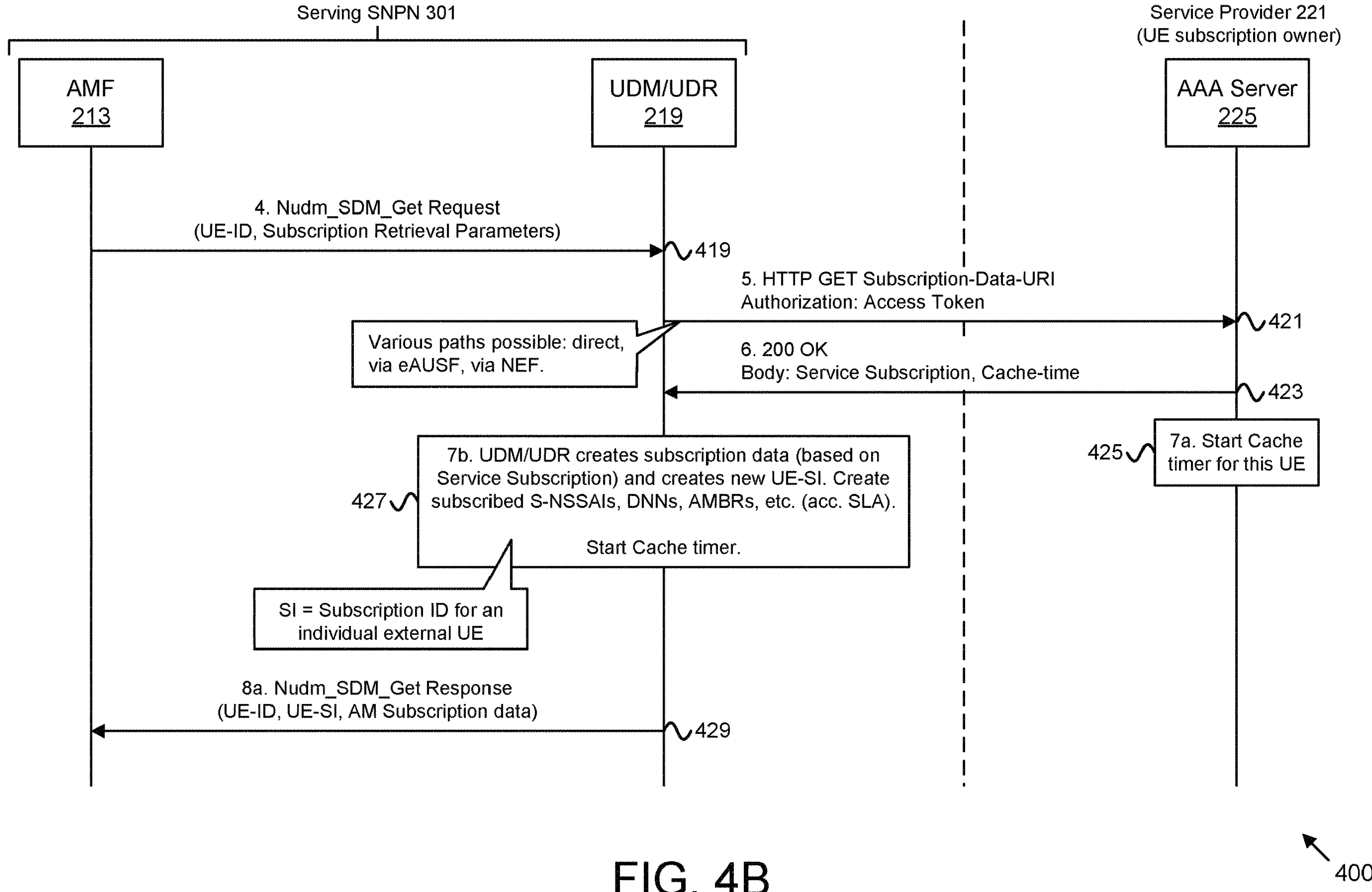
FIG. 4B is a continuation of the procedure depicted in FIG. 4A.
Figure 4C:
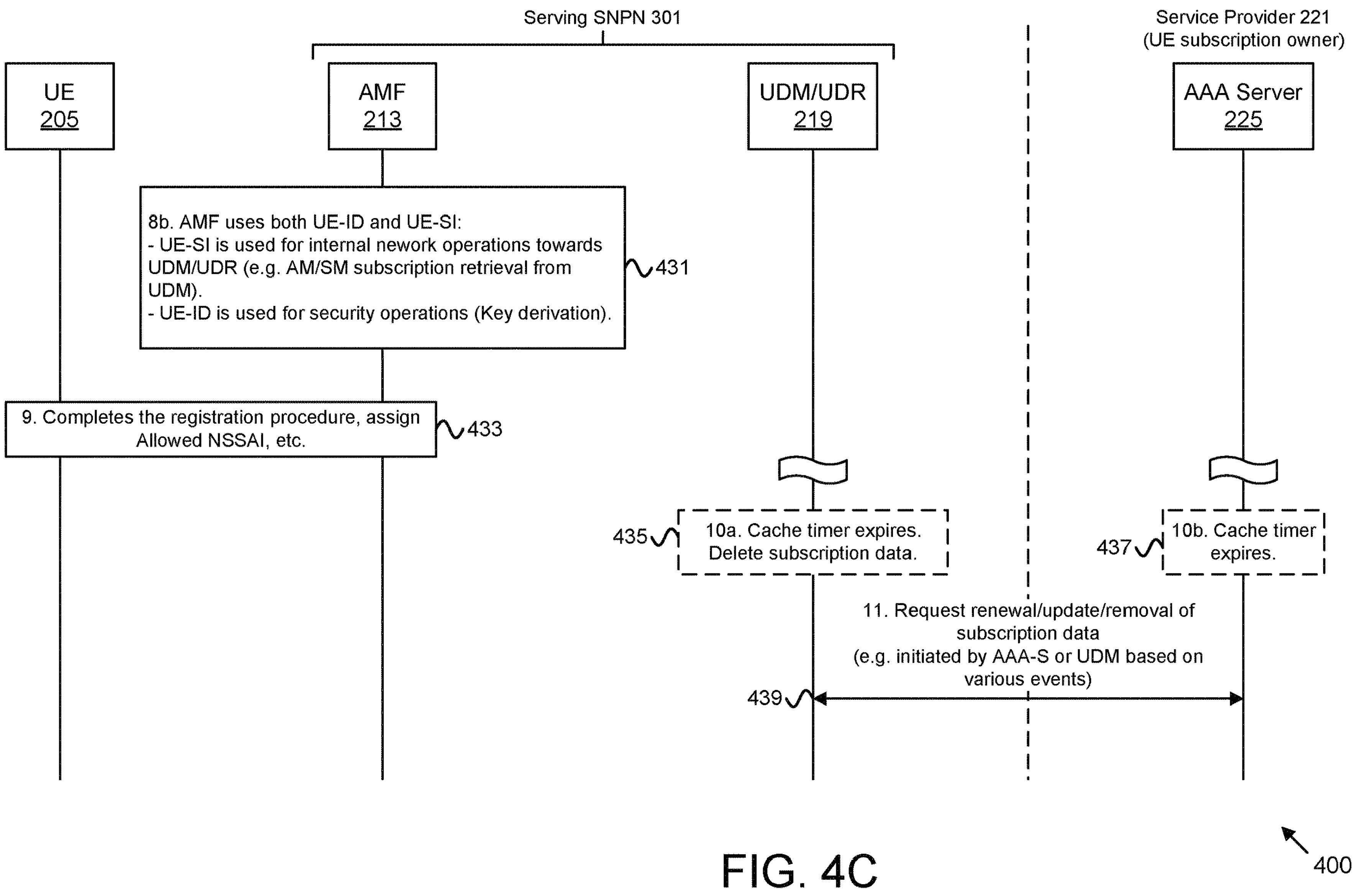
FIG. 4C is a continuation of the procedure depicted in FIGS. 4A-4B.

FIGS. 4A-4C depict a procedure 400 for registering a UE 205 with a visited SNPN, according to embodiments of the disclosure. The procedure 400 involves the UE 205 (e.g., one embodiment of the remote unit 105), a serving SNPN 301 comprising the AMF 213, the UDM/UDR 219, the eAUSF 217, and the AAA server 225 in the service provider network (i.e., the UE subscription owner). The procedure 400 represents a second solution for providing subscription data for an external subscriber and details signaling flow for how the UE 205 may register and establish a data connection (e.g., a PDU session, as depicted) with on-demand provisioning (pull method) of external subscription to the Serving SNPN 301.

The procedure 400 assumes that the Serving SNPN 301 and the SP 221 have setup an SLA. The AAA-server 225 sends to the AMF 213 one or more subscription retrieval parameters: e.g., 1) credentials for UE subscription data retrieval (e.g., an Access Token); and 2) the subscription data destination address (e.g., URI). The AMF 213 uses the subscription retrieval parameters to download the UE subscription data from the UDM/UDR 219.

The UDM/UDR 219 retrieves the UE service subscription from AAA-server 225 using the subscription retrieval parameters. The UDM/UDR 219 creates a temporary UE subscription data (based on the UE service subscription) and generates a UE subscription identifier (UE-SI) to be used in the SNPN 301 for subscription data retrieval from all NFs.

At FIG. 4A, the procedure 400 begins at step 0a where the UE 205 has a subscription with service provider (SP) 221 (see block 401). The subscription is identified by a UE-ID. The UE-ID also includes the identity of the SP 221. At step 0b, the SNPN 301 may store network local configuration to provide network service to subscribers from external SO/SP 221. For example, based on SLA with a particular SO/SP 221, the SNPN 301 can internally configure certain NFs (e.g., AMF 213, UDM/UDR 219, eAUSF 217) to allow network access for SO subscribers. Based on the SLA, the UDM/UDR 219 can be able to perform mapping of UE service subscription data from SO/SP to UE subscription data in the SNPN.

At step 0c, the SP 221 stores the agreement with the particular SNPN 301 (see block 405). This agreement may include a trust relationship and services and services parameters to be offered from the SNPN 301 to the SP subscribers. There may be a trust connection set up between SP 221 and SNPN 301 (e.g., eAUSF or AAA proxy). At step 1, the UE 205 selects the SNPN 301 as suitable serving network and sends Registration Request message (see messaging 407). This step is as described above with reference to step 1 of FIG. 3A.

At step 2a, the AMF 213 triggers the primary network authentication procedure for network access (see messaging 409). This step is as described above with reference to step 2a of FIG. 3A. At step 2b, the UE 205 is authenticated by the AAA server 225 (see block 411). Any EAP authentication method may be used.

At step 2c-1, after successful authentication, the AAA server 225 may determine whether the (external) service subscription for this UE 205 has been already provided to this SNPN 301 and whether the service subscription has expired. At step 2c-2, the AAA server 225 sends the authentication result (e.g., Success) to the AMF 213 (see messaging 415). The authentication result message may also contain at least one of the following parameters: UE-ID (identifying the UE at the SO/SP), Key material (e.g., Kseaf for deriving further keys for NAS layer or AS layer). In the case that the AAA server determines that the (external) service subscription is to be provided to the SNPN, the AAA server 225 sends the Subscription Retrieval Parameters to the SNPN 301 (i.e., to the AMF 213). The AAA server 225 can use either the same AAA message carrying the Authentication Result or a separate AAA message.

The Subscription Retrieval Parameters can include at least one of: UE-ID, Access Token (e.g., unique token to be used to retrieve the particular UE service subscription from the AAA server), Subscription-Data-URI (e.g., target address of subscription data, e.g., URI). The Subscription-Data-URI can contain a UE-ID, or AAA-server ID (FQDN or IP address) and other information needed to uniquely identify the UE's service subscription in the SO domain 221 and in the AAA server 225. Another embodiment can be applicable here as well similar to the embodiment described in step 2c in FIG. 3A where the Access Token and Subscription-Data-URI are not sent to the AMF 213 and instead an indication is sent to indicate that the (external) UE-ID can be used also for identification of the UE subscription data in the SNPN 301. In such case, the Subscription Retrieval Parameters contain 1) an (external) subscription identifier, e.g., (external) UE-ID, assuming that the UE-ID comprises the UE identity in the SO domain 221 and the address (URI, or domain name) of the target SO server/domain where UE's service subscription data is stored and 2) an indication to use the (external) UE-ID for identification of the UE subscription data in the SNPN 301. The AMF 213 uses both the UE-ID and the indication to use the (external) UE-ID as subscription identifier in the SNPN 301 when retrieving UE subscription data from UDM/UDR 219 and also signals both parameters to the other NFs in the SNPN 301 which need UE subscription data.

One reason for the AAA server 225 to send additional Access Token in the Subscription Retrieval Parameters to the SNPN (e.g., AMF) is that the AAA server 225 may want to protect the UE Service Subscription data to be retrieved from such an entity (e.g., AMF 213 or UDM/UDR 219 in SNPN 301), which is authorized from the AAA server 225. The Access Token or Subscription-Data-URI are meant to authorize the UDM in the AAA server 225. Upon reception of the AAA message, the AMF 213 stores the UE-ID and the associated Subscription Retrieval Parameters to be used for UE subscription retrieval.

At step 3, the AMF 213 performs NAS security mode command (SMC) with the UE 205 to setup the NAS security with the UE 205 (see block 415). The AMF 213 uses the Key material received in step 2c-2 to derive the further security keys.

Continuing on FIG. 4B, at step 4 the AMF 213 initiates UE subscription data retrieval with the UDM/UDR 219 (see messaging 419). Based on the received external Subscription Retrieval Parameters, the AMF 213 determines to select a UDM in the SNPN domain, but such UDM which is capable of handling external Subscription Retrieval Parameters. The AMF 213 sends Nudm_SDM_Get Request which may contain one of: UE-ID, Subscription Retrieval Parameters, etc. The selection of UDM/UDR 219 is as described above with reference to step 4a of FIG. 3A.

At step 5, the UDM/UDR 219 initiates a procedure to retrieve the UE service subscription data with the AAA server 225 (see messaging 421). For example, the UDM/UDR 219 may use the following HTTP GET Subscription-Data-URI Authorization: Access Token.

One of the following methods to exchange signaling (i.e., signaling path) with AAA server can be considered: 1) The UDM/UDR 219 may directly send AAA messages (or HTTP protocol messages) to the AAA server 225, e.g., HTTP GET message including Subscription-Data-URI and Access Token for Authorization; 2) The UDM/UDR 219 may exchange signaling with a AAA proxy or eAUSF 217 in the SNPN 221 domain (for example, there may be a common eAUSF or AAA proxy for exchanging the signaling for the primary authentication (step 2a, 2b, 2c-2) and for the subscription provisioning); 3) The UDM/UDR 219 may use the services from NEF and North Bound Interfaces to contact the AAA server 225. In third case, it is required that the NEF functionality be enhanced/modified to be used to exchange AAA-relevant information between UDM/UDR 219 and AAA server 225.

At step 6, the AAA server 225 replies to the request in step 5 (see messaging 423). For example, the AAA server 225 may send "200 OK" message including at least one of the parameters: Service Subscription, Cache-time, and other parameters.

The Service Subscription contains information about the services which the UE is subscribed/allowed to use according to the subscription owner. For example, the Service Subscription may contain one of: 1) type of the allowed connections (e.g., audio/video streaming, audio/video interactive application, or low latency AR/VR application, MBMS server, etc.); 2) the allowed max bit rate per connection; 3) the target data network per connection (e.g., Internet, SP provider domain, etc.); and/or 4) restriction of the access type for the UE 205 (e.g., use of NR access only, or LTE and NR access).

At step 7a, the AAA server 225 keeps track that the UE service subscription data has been sent to the SNPN 301 (see block 425). The AAA server 225 starts a timer having a value of 'Cache time' for this UE 205. This timer is used as validity time for which the SNPN 301 is allowed to store and use the UE Service Subscription data.

At step 7b, the UDM/UDR 219 creates subscription data based on received Service Subscription for the UE 205 (see block 427). The UDM/UDR 219 generates a new subscription identifier (SI) for the created subscription data, i.e., the UE-SI. Note that here the Subscription ID is for an individual external UE. The UDM/UDR 219 may take into account the Service Level Agreement with the SP/SO when creating the UE subscription data.

The subscription data contains all data needed for the normal network connectivity for the UE 205, i.e., AM subscription data (including subscribed S-NSSAIs, DNNs, mobility restrictions (preferred RAT type, Service Area Restriction), Subscribed-UE-AMBR, etc.), Slice Selection Subscription data, SMF Selection Subscription data, Session Management Subscription data (including default DNN, default PDU Session Type, Subscribed-Session-AMBR, 5GS Subscribed QoS profile, etc.) and others.

The UDM/UDR 219 may insert the second subscription data (e.g., the UE subscription data) to the UDR, which is in this document is assumed to be co-located with the UDM/UDR 219. The at least one PCF 216 may request the UDR to retrieve the UE subscription data. The UDM/UDR 219 may start a timer with a value 'Cache time' as received from the AAA server in step 6.

At step 8a, the UDM/UDR 219 responds to step 4 by sending the UE subscription data to the AMF 213 (see messaging 429). The UDM/UDR 219 may send a new subscription identifier for the subscription data. For example, the UDM/UDR 219 may use the service operation Nudm_SDM_Get Response (UE-ID, UE-SI, AM Subscription data, etc.).

Continuing on FIG. 4C, at step 8b the AMF 213 stores the received UE subscription data (see block 431). The AMF 213 uses both UE identifiers, i.e., UE-ID and UE-SI, as described in step 4a of FIG. 3B.

At step 9, the AMF 213 completes the registration procedure, e.g., as per 3GPP specification TS 23.502 (see block 433). For this purpose, the AMF 213 derives the parameters to be included in the Registration Accept message, e.g., Allowed NSSAI, Mobility Restrictions, etc.

At step 10a, the UDM/UDR 219 runs the validity timer with the 'Cache value,' as per step 7 (see block 435). Upon expiration of the validity timer, the UDM/UDR 219 may (optionally) delete the UE subscription data. Alternatively, the UDM/UDR 219 may request the AAA server 225 to refresh the UE subscription data, as shown in step 11.

At step 10b, the AAA server 225 also runs the validity timer with the 'Cache value' (see block 437). Upon expiration of the validity timer in the AAA server 225, the AAA server 225 may (optionally) request the SNPN 301 to delete or to refresh the UE subscription data.

At step 11, the UDM/UDR 219 and AAA server 225 can perform one of the following procedures: renewal, update, or removal of the UE subscription data (see messaging 439). The operations of renewal, update or removal of the UE subscription data can be triggered either in the UDM/UDR 219 towards the AAA server 225, or in the AAA server 225 towards the UDM/UDR 219. The signaling path between the UDM/UDR 219 and the AAA server 225 can be the same as described in step 5.

These procedures can be triggered upon one of the following triggers: expiration of the validity timer in step 10a or 10b; or change of the Service Subscription data in the AAA server; or upon registration of the UE 205 with a new network, where the AAA server 225 can determine to remove the UE subscription data in the current SNPN 301. Note that the AAA messaging may conform with any Diameter, Radius, or other AAA protocol.

Please note that in another embodiment of FIG. 4, the UE-SI may not be used and instead an indication is sent to the AMF 213 to indicate that the (external) UE-ID can be used also for identification of the UE subscription data in the SNPN 301 (e.g., UDM/UDR 219, SMF 215, PCF, etc.).

The benefit of this second solution is that the UE Service Subscription data may be updated dynamically in the SP/SO 221 and, correspondingly, the UE subscription data may be updated in the serving SNPN 301.

Note that the use of the procedure 300 or the procedure 400 may be negotiated between the SNPN 301 and the SP/SO 221 during step 0. For example, the SP/SO 221 may use the procedure 300 (pre-provisioned subscriber data) for some SNPNs and the procedure 400 (dynamic provisioning of subscriber data) for other SNPNs.

Figure 5A:
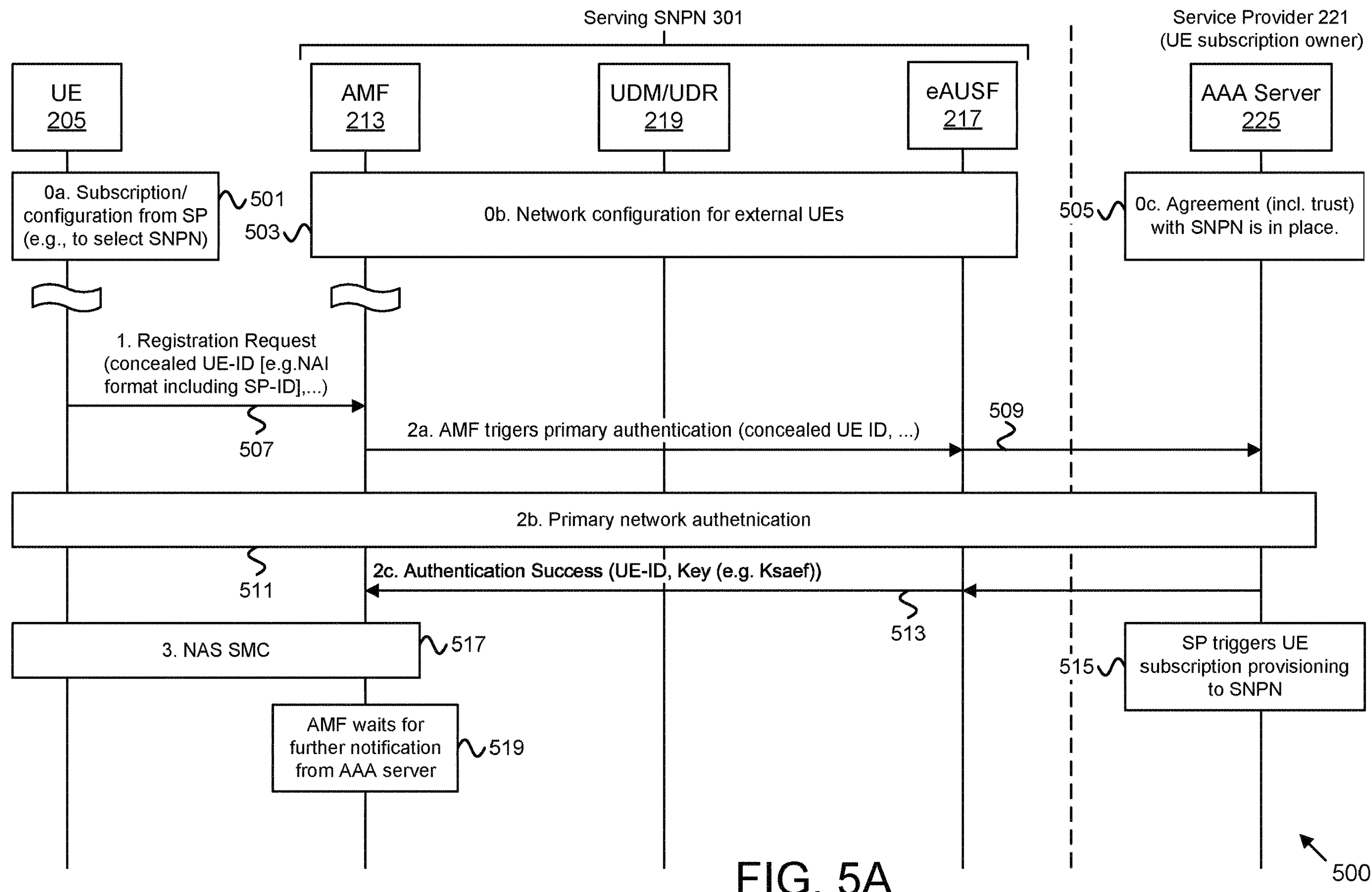
FIG. 5A is a block diagram illustrating one embodiment of signaling flow for dynamic provisioning of external subscription to Serving SNPN triggered from the AAA server.

FIGS. 5A-4C depict a procedure 500 for registering a UE 205 with a visited SNPN, according to embodiments of the disclosure. The procedure 500 involves the UE 205 (e.g., one embodiment of the remote unit 105), a serving SNPN 301 comprising the AMF 213, the UDM/UDR 219, the eAUSF 217, and the AAA server 225 in the service provider network (i.e., the UE subscription owner). The procedure 300 represents a third solution for providing subscription data for an external subscriber and details signaling flow for how the UE 205 may register and establish a data connection (e.g., a PDU session, as depicted) with dynamic provisioning (push method) of the external UE Service Subscription to the Serving SNPN 301 initiated by the AAA server 225. The third solution is based on the AAA server 225 triggering a push of the UE subscription data to the UDM/UDR 219 after successful primary authentication and authorization.

The procedure 500 assumes that the Serving SNPN 301 and the SP 221 have setup an SLA. The AAA-server 225 sends to the AMF 213 one or more subscription retrieval parameters: e.g., 1) credentials for UE subscription data retrieval (e.g., an Access Token); and 2) the subscription data destination address (e.g., URI). The AMF 213 uses the subscription retrieval parameters to download the UE subscription data from the UDM/UDR 219.

The UDM/UDR 219 retrieves the UE service subscription from AAA-server 225 using the subscription retrieval parameters. The UDM/UDR 219 creates a temporary UE subscription data (based on the UE service subscription) and generates a UE subscription identifier (UE-SI) to be used in the SNPN 301 for subscription data retrieval from all NFs.

At FIG. 5A, the procedure 500 begins at step 0a where the UE 205 has a subscription with service provider (SP) 221 (see block 501). At step 0b, the SNPN 301 may store one or more subscription data sets for different groups of UEs, which are SP subscribers (see block 503). At step 0c, the SI is provided to the SP 221 (see block 505). The steps 0a-0c are as described above with reference to steps 0a-0c of FIG. 4A.

At step 1, the UE 205 selects the SNPN 301 as suitable serving network and sends Registration Request message (see messaging 507). This step is also as described above with reference to step 1 of FIG. 4A.

At step 2a, the AMF 213 triggers the primary network authentication procedure for network access (see messaging 509). At step 2b, the UE 205 is authenticated by the AAA server 225 (see block 511). The steps 2a-2b are as described above with reference to steps 2a-2b of FIG. 3A.

At step 2c, after the EAP authentication is completed, the AAA server 225 sends the authentication result (Success or Failure) to the AMF 213 (see messaging 511). In case of Authentication result is successful, the message may also contain at least one of the following parameters: UE-ID (identifying the UE at the SO/SP), Key material (e.g., Kseaf for deriving further keys for NAS layer or AS layer), an Group-SI (used to identify the UE subscription data in the serving SNPN 301). Note that in the procedure 500, the AAA server 225 does not send subscription retrieval parameters to the SNPN 301 (i.e., to the AMF 213). Note that successful EAP authentication also causes the SP 221 to trigger UE subscription provisioning to the SNPN 301 (see block 515).

At step 3, the AMF 213 performs NAS security mode command (SMC) with the UE 205 to setup the NAS security with the UE 205 (see block 515). The AMF 213 uses the Key material received in step 2c to derive the further security keys. Afterwards, the AMF 213 waits for further notification from the AAA server 225 about the UE subscription (see block 517). Alternatively, the AMF 213 may request the AAA server 225 for UE subscription.

Figure 5B:
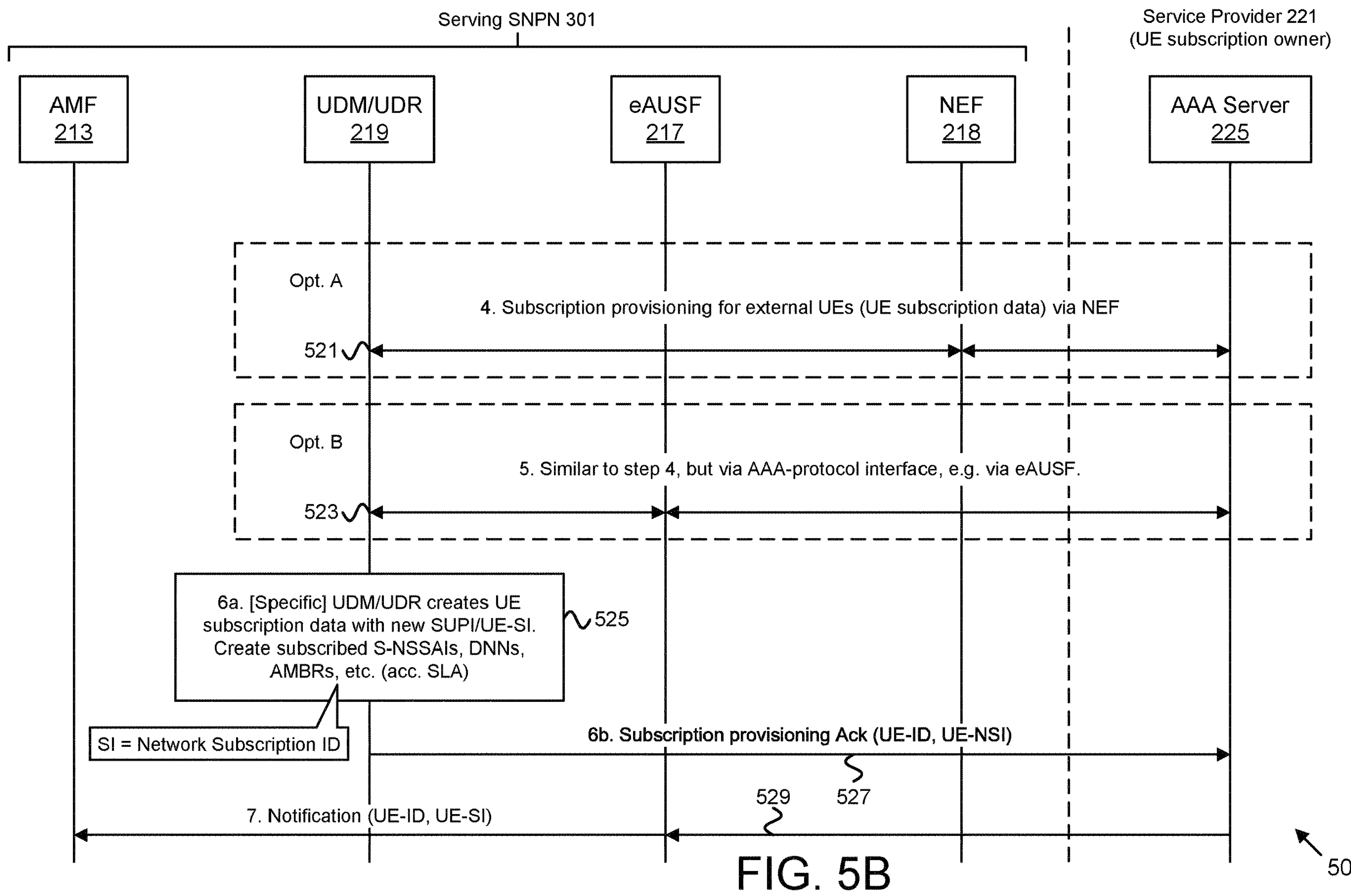
FIG. 5B is a continuation of the procedure depicted in FIG. 5A.

Continuing on FIG. 5B, the AAA server initiates dynamic provisioning of the serving SNPN 301 (i.e., UDM/UDR 219) using either the NEF 218 as intermediary (labelled 'Option A' in FIG. 5B) or using the eAUSF 217 as intermediary (labelled 'Option B' in FIG. 5B).

At step 4, after the successful authentication of the UE 205, the AAA server 205 triggers UE subscription provisioning procedure towards the SNPN 301 (Option A, see messaging 521). If the AAA server 225 is configured to use the North Bound Interface (NBI) towards the NEF 218 (e.g., during step 0), then the AAA server 225 may invoke NBI operation to provision the UE service subscription data to the UDM/UDR 219 via NEF 218. The NEF 218 is enhanced (or appropriately configured) to discover a UDM instance in the SNPN 301 which is capable to create UE subscription data for external subscribers.

At step 5 (an alternative to step 4), the AAA server 225 may send the UE Service Subscription data to the UDM/UDR 219 via the eAUSF function 218 (Option B, messaging 523). The benefit of Option B is that the AAA server 225 already has an association with the eAUSF 217 and can re-use this association for the signaling exchange with the UDM/UDR 219. Here, the eAUSF 217 is enhanced (or appropriately configured) to discover a UDM instance in the SNPN 301 which is capable to create UE subscription data for external subscribers. Note that the use of Option A or Option B may be configured during the SLA negotiation in step 0.

At step 6a, the UDM/UDR 219 creates subscription data based on received Service Subscription for the UE 205 (see block 525). The UDM/UDR 219 generates a new subscription identifier (SI) for the created subscription data, i.e., the UE-SI. Note that here the Subscription ID is a Network subscription ID. The UDM/UDR 219 may take into account the Service Level Agreement with the SP/SO when creating the UE subscription data.

The subscription data contains all data needed for the normal network connectivity for the UE 205, i.e., AM subscription data (including subscribed S-NSSAIs, DNNs, mobility restrictions (preferred RAT type, Service Area Restriction), Subscribed-UE-AMBR, etc.), Slice Selection Subscription data, SMF Selection Subscription data, Session Management Subscription data (including default DNN, default PDU Session Type, Subscribed-Session-AMBR, 5GS Subscribed QoS profile, etc.) and others. The UDM/UDR 219 may insert the second subscription data to UDR, as the PCF 216 may request the UDR to retrieve the UE subscription data.

At step 6b, the UDM/UDR 219 acknowledges the successful provisioning of the UE subscription data in the SNPN 301. The UDM/UDR 219 includes the subscription identifier (SI) assigned in step 6a.

At step 7, the AAA server 225 sends a Notification message to the AMF 213 including the subscription identifier (SI) received from the UDM/UDR 219 for the created UE subscription data in the SNPN 301 (see messaging 529).

Continuing on FIG. 5C, at step 8a the AMF 213 stores the received UE subscription data (see block 531). The AMF 213 uses both UE identifiers, i.e., UE-ID and UE-SI, as described in step 5a of FIG. 3B. At step 8b, AMF 213 retrieves the subscription data of the UE 205 from the UDM/UDR 219, e.g., access and mobility (AM) subscription data, SMF Selection Subscription data, UE context in SMF data and LCS mobile origination subscription (see messaging 531).

At step 9, the AMF 213 completes the registration procedure, e.g., as per 3GPP specification TS 23.502 (see block 533). For this purpose, the AMF 213 derives the parameters to be included in the Registration Accept message, e.g., Allowed NSSAI, Mobility Restrictions, etc.

At step 10, the UDM/UDR 219 and AAA server perform a procedure to maintain the UE subscription data in the SNPN, i.e., UE subscription data renewal, update, or removal (see block 535). The maintenance procedure can be triggered upon one of the following triggers: expiration of a validity timer; or change of the Service Subscription data in the AAA server; or upon registration of the UE 205 with a new network, where the AAA server 225 can determine to remove the UE subscription data in the current SNPN 301. The maintenance procedure may be as described above with reference to steps 10a, 10b, and 11 of FIG. 4C.

The benefit of this third solution is that the UE Service Subscription data may be updated dynamically in the SP/SO 221 and, correspondingly, the UE subscription data may be updated in the serving SNPN 301.

Figure 6:
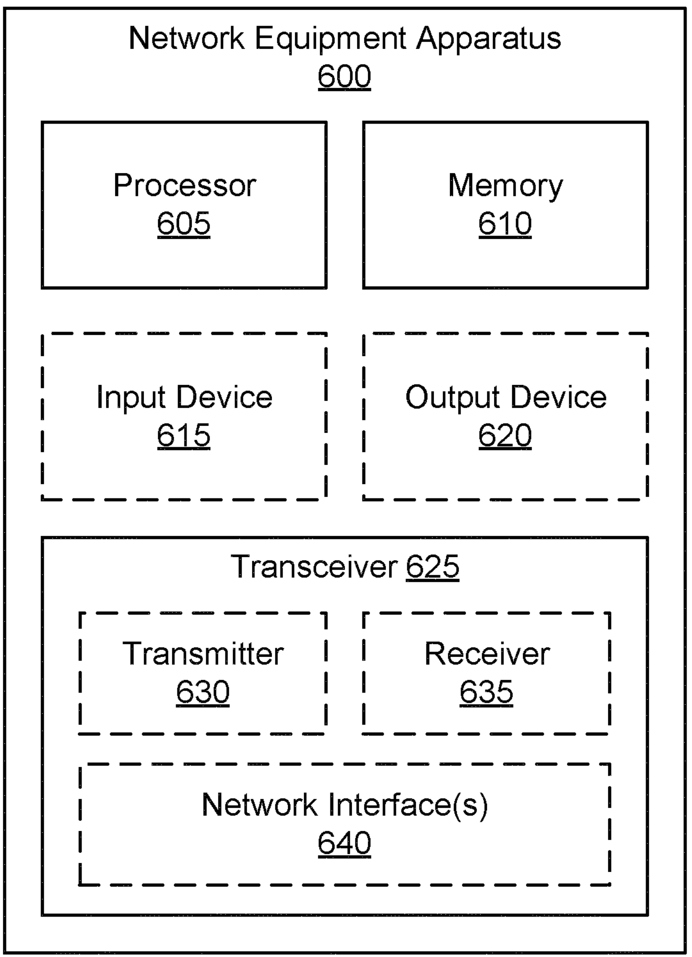
FIG. 6 is a block diagram illustrating one embodiment of a network equipment apparatus for providing subscription data for an external subscriber.

FIG. 6 depicts one embodiment of a network equipment apparatus 600 that may be used for registering with a mobile network through another mobile network, according to embodiments of the disclosure. In some embodiments, the network equipment apparatus 600 may be one embodiment of a 5G-RG. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640, such as the N1 interface depicted in FIG. 4. In some embodiments, the transceiver 625 supports a first interface for communicating with a RAN node, a second interface for communicating with one or more network functions in a mobile core network (e.g., a 5GC) and a third interface for communicating with a remote unit (e.g., UE).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the first transceiver 625.

In various embodiments, the processor 605 controls the network equipment apparatus 600 to implement the above described UDM/UDR behaviors. In some embodiments, the processor receives, from a network function in the mobile communication network (e.g., from an AMF) and via a network interface 640, a request to provide a subscription data for a UE of an external subscriber. Here, the request contains at least one subscription retrieval parameter (e.g., Access Token, Subscription Retrieval URI) which indicates that the subscription data is stored in a subscription owner outside the mobile communication network.

In some embodiments, the at least one subscription retrieval parameter comprises a credential (e.g., Access Token) to be used to retrieve the first subscription data, wherein the credential is provided to the network function by the subscription owner (e.g., AAA server). In some embodiments, the at least one subscription retrieval parameter comprises a target address (e.g., Subscription Retrieval URI) of the subscription data. In certain embodiments, the target address contains an external subscriber identifier of the UE.

The processor 605 retrieves first subscription data from the subscription owner using the at least one subscription retrieval parameter and creates second subscription data using the first subscription data. In some embodiments, the creating of the second subscription data (in UDM/UDR) is based on the retrieved first subscription data and on a service agreement with the subscription owner.

The processor 605 generates a new subscription identifier (e.g., UE-SI or Group-SI) associated with the second subscription data. In some embodiments, the new subscription identifier comprises one of: a group identifier corresponding to a class of subscribers and an individual subscriber identifier.

In some embodiments, the processor 605 further initiates a validity timer (e.g., the Cache time, discussed above) for the second subscription data. In one embodiment, the processor 605 deletes the second subscription data in response to expiration of the validity timer. In another embodiment, the processor 605 updates the second subscription data in response to expiration of the validity timer.

The processor 605 transmits, via the network interface 640, a response to the network function. Here, the response comprising the second subscription data and the new subscription identifier.

In various embodiments, the processor 605 controls the network equipment apparatus 600 to implement the above described AMF behaviors. In some embodiments, via the network interface 640 the processor 605 receives a registration request message from a UE. Here, the registration request message contains an external subscriber identifier of the UE (e.g., UE-ID).

Via the network interface 640 the processor 605 receives a subscription retrieval information (e.g., Group-SI, Access Token, or Subscription Retrieval URI from AAA-server; or UE-SI from UDM). Here, the subscription retrieval information is different than the UE identifier. In some embodiments, the subscription retrieval information comprises at least one subscription retrieval parameter which is included in the first request.

In some embodiments, the at least one subscription retrieval parameter comprises a credential to access external subscription data (e.g., Access token), the credential provided to the network function by the subscription owner. In some embodiments, the at least one subscription retrieval parameter comprises a target address (e.g., Subscription Retrieval URI) of the subscription data. In certain embodiments, the target address comprises a UE identifier. In some embodiments, the subscription retrieval parameter comprises a group subscription identifier corresponding to a class of subscribers.

In some embodiments, receiving the subscription retrieval information comprises receiving subscription retrieval information from an authentication server (AAA server) of the subscription owner. In certain embodiments, receiving the subscription retrieval information further comprises receiving an individual subscription identifier from a subscriber data management function (UDM) in the mobile communication network.

Via the network interface 640 the processor 605 transmits to a network function (to UDM/UDR) in the mobile communication network a first request for subscription data retrieval using the subscription retrieval information, wherein the subscription retrieval information indicates that the subscription data is stored in a subscription owner outside the mobile communication network. Via the network interface 640 the processor 605 receives a response message from the network function (from UDM/UDR) that contains the UE subscription data.

In certain embodiments, the processor transmits the subscription identifier (along with the UE identifier) to other network functions (e.g., SMF, PCF, etc.) to be used for subscription retrieval (e.g., from the UDM/UDR) within the serving network. In certain embodiments, the processor uses the UE identifier (external subscriber identifier) for security operations (e.g., deriving the NAS and AS keys, re-authentication with the subscription owner, exchange signaling with eAUSF, etc.).

In some embodiments, the processor uses the subscription retrieval information as a subscription identifier in the UDM/UDR (e.g., UE-SI, Group-SI) to identify the subscription for transactions within a serving network (in the UDM/UDR). In such embodiments, the UE identifier is used to identify the subscription for transactions outside the serving network.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to registering with a mobile network through another mobile network, for example storing security contexts, IP addresses, UE contexts, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 130). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
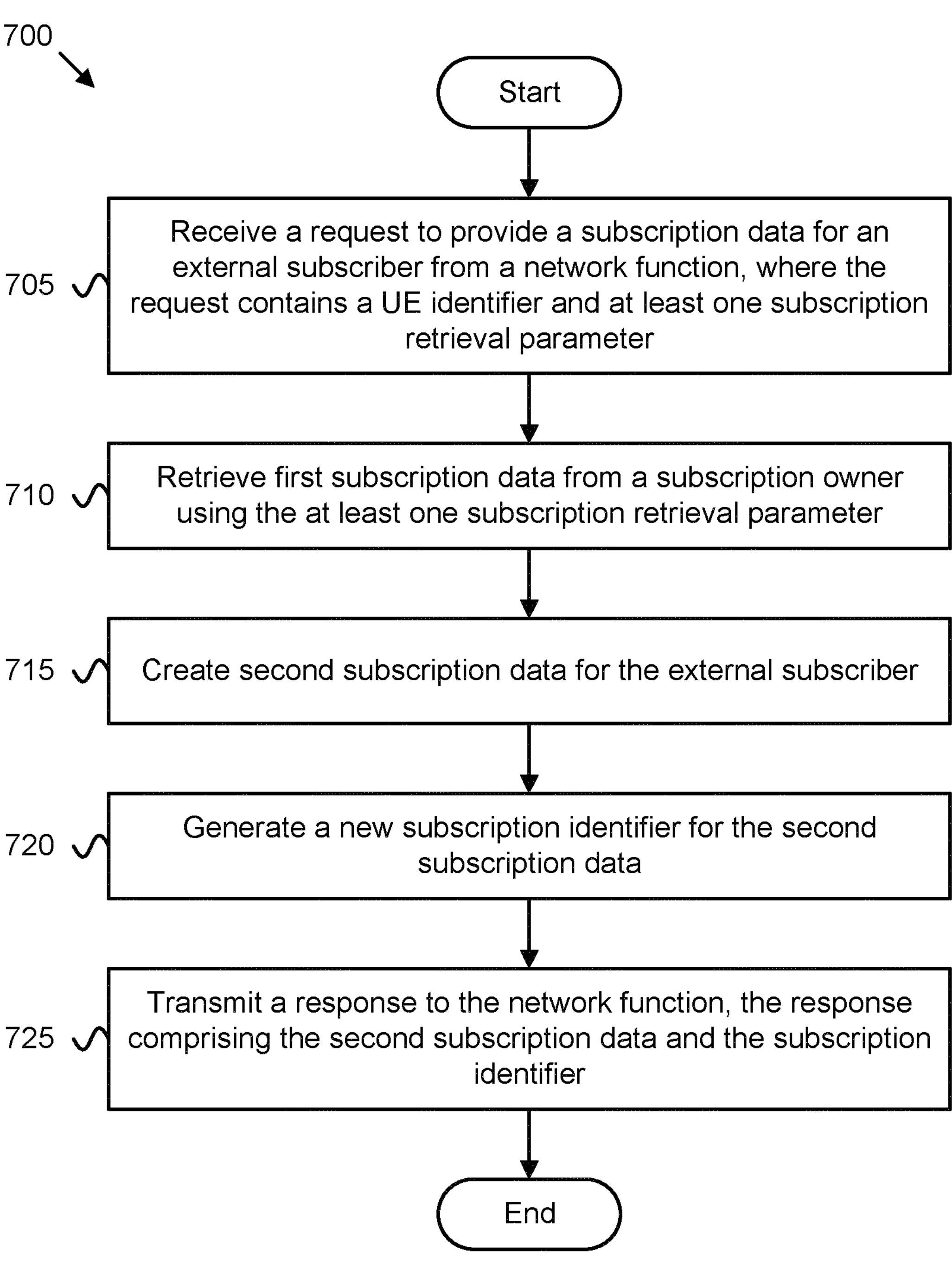
FIG. 7 is a flow chart diagram illustrating one embodiment of a first method for providing subscription data for an external subscriber.

FIG. 7 depicts one embodiment of a method 700 for providing subscription data for an external subscriber, according to embodiments of the disclosure. In various embodiments, the method 700 is performed by a subscription and user data manager in a mobile communication network, such as the UDM/UDR 129, the UDM/UDR 219, and/or the network equipment apparatus 600, described above. In some embodiments, the method 700 is performed by a processor, such as a microcontroller, a microprocessor, a CPU, a GPU, an auxiliary processing unit, a FPGA, or the like.

The method 700 begins and receives 705 a request to provide a subscription data for an external subscriber from a network function in a mobile communication network. Here, the request contains at least one subscription retrieval parameter the at least one subscription retrieval parameter indicates that the subscription data is stored in a subscription owner outside the mobile communication network. The method 700 includes retrieving 710 first subscription data from a subscription owner using the at least one subscription retrieval parameter. The method 700 includes creating 715 second subscription data using the first subscription data. The method 700 includes generating 720 a new subscription identifier associated with the second subscription data. The method 700 includes transmitting 725 a response to the network function, the response comprising the second subscription data and the subscription identifier. The method 700 ends.

Figure 8:
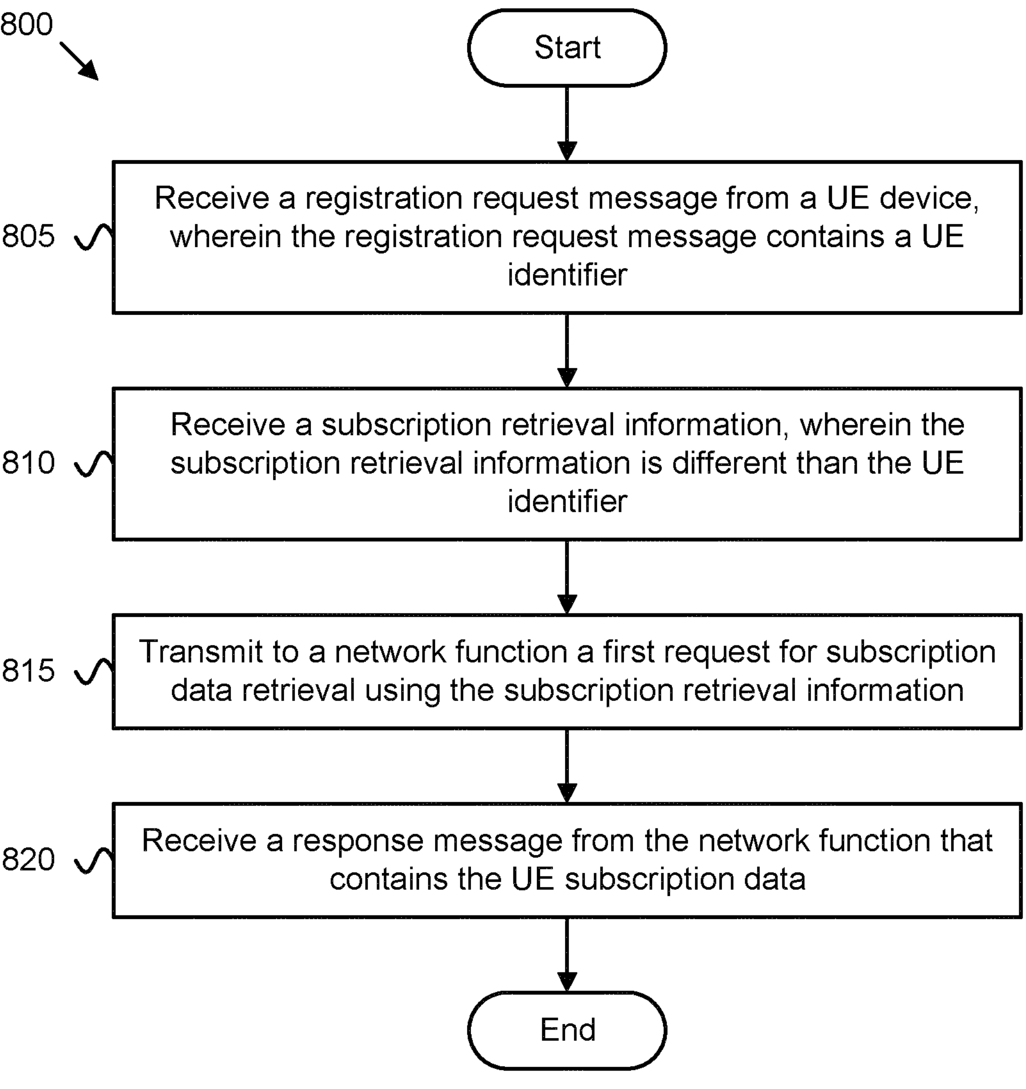
FIG. 8 is a flow chart diagram illustrating one embodiment of a second method for providing subscription data for an external subscriber.

FIG. 8 depicts one embodiment of a method 800 for providing subscription data for an external subscriber, according to embodiments of the disclosure. In various embodiments, the method 800 is performed by an AMF in a mobile communication network, such as the AMF 123, the AMF 213, and/or the network equipment device 600, described above. In some embodiments, the method 800 is performed by a processor, such as a microcontroller, a microprocessor, a CPU, a GPU, an auxiliary processing unit, a FPGA, or the like.

The method 800 begins and receives 805 a registration request message from a UE, wherein the registration request message contains an external subscriber identifier of the UE. The method 800 includes receiving 810 a subscription retrieval information, wherein the subscription retrieval information is different than the external identifier of the UE. The method 800 includes transmitting 815 to a network function a first request for subscription data retrieval using the subscription retrieval information, wherein the subscription retrieval information indicates that the subscription data is stored in a subscription owner outside the mobile communication network. The method 800 includes receiving 820 a response message from the network function that contains the UE subscription data. The method 800 ends.

Disclosed herein is a first apparatus for providing subscription data for an external subscriber, according to embodiments of the disclosure. The first apparatus may be implemented by a subscription and user data manager in a mobile communication network, such as the UDM/UDR 129, the UDM/UDR 219, and/or the network equipment apparatus 600. The first apparatus includes a processor and a network interface that receives, from a network function in the mobile communication network (e.g., from AMF), a request to provide a subscription data for a UE. Here, the request contains at least one subscription retrieval parameter (e.g., Access Token and/or Subscription Retrieval URI), wherein the at least one subscription retrieval parameter indicates that the subscription data is stored in a subscription owner outside the mobile communication network. The processor retrieves first subscription data from the subscription owner using the at least one subscription retrieval parameter and creates second subscription data using the first subscription data. The processor generates a new subscription identifier (e.g., UE-SI or Group-SI) associated with the second subscription data and transmits, via the network interface, a response to the network function. Here, the response comprising the second subscription data and the new subscription identifier.

In some embodiments, the processor further initiates a validity timer (e.g., the Cache time, discussed above) for the second subscription data. In one embodiment, the processor deletes the second subscription data in response to expiration of the validity timer. In another embodiment, the processor updates the second subscription data in response to expiration of the validity timer.

In some embodiments, the at least one subscription retrieval parameter comprises a credential (e.g., Access token and subscription URI) to be used to retrieve the first subscription data, wherein the credential is provided to the network function by the subscription owner (e.g., AAA server). In some embodiments, the at least one subscription retrieval parameter comprises a target address of the subscription data. In certain embodiments, the target address contains an external subscriber identifier of the UE.

In some embodiments, the new subscription identifier comprises one of: a group identifier corresponding to a class of subscribers and an individual subscriber identifier. In some embodiments, the creating of the second subscription data (in UDM/UDR) is based on the received first subscription data and on a service agreement with the subscription owner.

Disclosed herein is a first method for providing subscription data for an external subscriber, according to embodiments of the disclosure. The first method may be performed by a subscription and user data manager in a mobile communication network, such as the UDM/UDR 129, the UDM/UDR 219, and/or the network equipment apparatus 600. The first method includes receiving a request to provide a subscription data for a UE from a network function in the mobile communication network. Here, the request contains at least one subscription retrieval parameter (e.g., Access Token and/or Subscription Retrieval URI), wherein the at least one subscription retrieval parameter indicates that the subscription data is stored in a subscription owner outside the mobile communication network. The first method includes retrieving first subscription data from the subscription owner using the at least one subscription retrieval parameter and creating second subscription data using the first subscription data. The first method includes generating a new subscription identifier associated with the second subscription data and transmitting a response to the network function, the response comprising the second subscription data and the subscription identifier.

In some embodiments, the first method further includes initiating a validity timer (e.g., the Cache time, discussed above) for the second subscription data and performing an action in response to expiration of the validity timer. In one embodiment, said action comprises deleting the second subscription data. In one embodiment, said action comprises updating the second subscription data.

In some embodiments, the at least one subscription retrieval parameter comprises a credential (e.g., Access token and subscription URI) to be used to retrieve the first subscription data, wherein the credential is provided to the network function by the subscription owner (e.g., AAA server). In some embodiments, the at least one subscription retrieval parameter comprises a target address of the subscription data. In certain embodiments, the target address contains an external subscriber identifier of the UE.

In some embodiments, the new subscription identifier comprises one of: a group identifier corresponding to a class of subscribers and an individual subscription identifier. In some embodiments, the creating of the second subscription data (in UDM/UDR) is based on the received first subscription data and on a service agreement with the subscription owner.

Disclosed herein is a second apparatus for providing subscription data for an external subscriber, according to embodiments of the disclosure. The second apparatus may be implemented by an AMF in a mobile communication network, such as the AMF 123, the AMF 213, and/or the network equipment device 600. The second apparatus includes a processor and a network interface that receives a registration request message from a UE and receives a subscription retrieval information (e.g., Group-SI, Access token, or Subscription URI from AAA-server; or UE-SI from UDM). Here, the registration request message contains an external subscriber identifier of the UE (e.g., UE-ID), where the subscription retrieval information is different than the UE's external subscriber identifier. The processor transmits to a network function in the mobile communication network (to UDM/UDR) a first request for subscription data retrieval using the subscription retrieval information and receives a response message from the network function (from UDM/UDR) that contains the UE subscription data. Here, the subscription retrieval information indicates that the subscription data is stored in a subscription owner outside the mobile communication network.

In some embodiments, the subscription retrieval information comprises at least one subscription retrieval parameter which is included in the first request for subscription data retrieval. In certain embodiments, the at least one subscription retrieval parameter comprises a credential to access external subscription data (e.g., Access token), the credential provided to the network function by the subscription owner.

In some embodiments, the at least one subscription retrieval parameter comprises a target address of the subscription data. In certain embodiments, the target address comprises the UE's external subscriber identifier. In some embodiments, the subscription retrieval parameter comprises a group subscription identifier corresponding to a class of subscribers.

In some embodiments, receiving the subscription retrieval information comprises receiving subscription retrieval information from an authentication server (AAA server) of the subscription owner. In certain embodiments, receiving the subscription retrieval information further comprises receiving an individual subscription identifier from a subscriber data management function (UDM) in the mobile communication network.

In some embodiments, the processor uses the subscription retrieval information as a subscription identifier in the UDM/UDR (e.g., UE-SI, Group-SI) to identify the subscription for transactions within a serving network (in the UDM/UDR). In such embodiments, the UE's external subscriber identifier is used to identify the subscription for transactions outside the serving network. In certain embodiments, the processor transmits the subscription identifier (along with the UE identifier) to other network functions (e.g., SMF, PCF, etc.) to be used for subscription retrieval (e.g., from the UDM/UDR) within the serving network. In certain embodiments, the processor uses the UE's external subscriber identifier for security operations (e.g., deriving the NAS and AS keys, re-authentication with the subscription owner, exchange signaling with eAUSF, etc.).

Disclosed herein is a second method for providing subscription data for an external subscriber, according to embodiments of the disclosure. The second method may be performed by an AMF in a mobile communication network, such as the AMF 123, the AMF 213, and/or the network equipment device 600. The second method includes receiving a registration request message from a UE and receiving subscription retrieval information. Here, the registration request message contains an external subscriber identifier of the UE (e.g., UE-ID), where the subscription retrieval information is different than the UE's external subscriber identifier. The second method includes transmitting to a network function in the mobile communication network (to UDM/UDR) a first request for subscription data retrieval using the subscription retrieval information and receiving a response message from the network function that contains the UE subscription data. Here, the subscription retrieval information indicates that the subscription data is stored in a subscription owner outside the mobile communication network.

In some embodiments, the subscription retrieval information comprises at least one subscription retrieval parameter which is included in the first request for subscription data retrieval. In certain embodiments, the at least one subscription retrieval parameter comprises a credential to access external subscription data (e.g., Access token), the credential provided to the network function by the subscription owner.

In some embodiments, the at least one subscription retrieval parameter comprises a target address of the subscription data. In certain embodiments, the target address comprises the UE's external subscriber identifier. In some embodiments, the subscription retrieval parameter comprises a group subscription identifier corresponding to a class of subscribers.

In some embodiments, receiving the subscription retrieval information comprises receiving subscription retrieval information from an authentication server (AAA server) of the subscription owner. In certain embodiments, receiving the subscription retrieval information further comprises receiving an individual subscription identifier from a subscriber data management function (UDM) in the mobile communication network.

In some embodiments, the second method includes using the subscription retrieval information as a subscription identifier in the UDM/UDR (e.g., UE-SI, Group-SI) to identify the subscription for transactions within a serving network (in the UDM/UDR). In such embodiments, the UE's external subscriber identifier is used to identify the subscription for transactions outside the serving network. In certain embodiments, the second method includes transmitting the subscription identifier (along with the UE identifier) to other network functions (e.g., SMF, PCF, etc.) to be used for subscription retrieval (e.g., from the UDM/UDR) within the serving network. In certain embodiments, the second method includes using the UE's external subscriber identifier for security operations (e.g., deriving the NAS and AS keys, re-authentication with the subscription owner, exchange signaling with eAUSF, etc.).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A unified data management ("UDM") apparatus comprising:

at least one memory; and at least one processor coupled with the at least one memory and configured to cause the UDM apparatus to:

receive, from an access and mobility management function ("AMF") in a mobile communication network, a request to provide subscription data for a user equipment ("UE"), wherein the request contains at least one subscription retrieval parameter and wherein the at least one subscription retrieval parameter indicates that the subscription data is stored in a subscription owner outside the mobile communication network;

retrieve first subscription data from the subscription owner using the at least one subscription retrieval parameter, wherein the first subscription data comprises at least one of the following for the UE: a mobility restriction, access and mobility ("AM") subscription data, slice selection subscription data, session management function ("SMF") selection subscription data, SMF management subscription data, or a combination thereof;

create second subscription data based on the first subscription data and a service agreement with the subscription owner;

generate a subscription identifier associated with the second subscription data; and transmit a response to the AMF, the response comprising the second subscription data and the subscription identifier.

2. The UDM apparatus of claim 1, wherein the at least one processor is configured to cause UDM to initiate a validity timer for the second subscription data and perform an action in response to expiration of the validity timer, the action comprising: deleting the second subscription data or updating the second subscription data.

3. The UDM apparatus of claim 1, wherein the at least one subscription retrieval parameter comprises a credential to be used to retrieve the first subscription data, wherein the credential is provided by the subscription owner.

4. The UDM apparatus of claim 1, wherein the at least one subscription retrieval parameter comprises a target address of the subscription data.

5. The UDM apparatus of claim 4, wherein the target address contains an external subscriber identifier of the UE.

6. The UDM apparatus of claim 1, wherein the generated subscription identifier comprises: a group identifier corresponding to a class of subscribers or an individual subscriber identifier.

7. A method performed by a unified data management ("UDM") entity, the method comprising:

receiving, from an access and mobility management function ("AMF") in a mobile communication network, a request to provide subscription data for a user equipment ("UE"), wherein the request contains at least one subscription retrieval parameter and wherein the at least one subscription retrieval parameter indicates that the subscription data is stored in a subscription owner outside the mobile communication network;

retrieving first subscription data from a subscription owner using the at least one subscription retrieval parameter, wherein the first subscription data comprises at least one of the following for the UE: a mobility restriction, access and mobility ("AM") subscription data, slice selection subscription data, session management function ("SMF") selection subscription data, SMF management subscription data, or a combination thereof;

creating second subscription data based on the first subscription data and a service agreement with the subscription owner;

generating a subscription identifier associated with the second subscription data; and transmitting a response to the AMF, the response comprising the second subscription data and the subscription identifier.

8. An access and mobility management function ("AMF") comprising:

at least one memory; and at least one processor coupled with the at least one memory and configured to cause the AMF to:

receive, from a user equipment ("UE"), a registration request message comprising an external subscriber identifier of the UE;

determine, based at least in part on the external subscriber identifier, that subscription data associated with the UE is stored in a subscription owner outside a mobile communication network;

trigger UE authentication with a subscription owner in response to the registration request message;

receive subscription retrieval information corresponding to the external subscriber identifier in response to a successful authentication of the UE, wherein the subscription retrieval information is from at least one of an authentication server of a subscription owner and a subscriber data management in the mobile communication network, wherein the subscription retrieval information comprises one or more of: an access credential associated with the subscription data, a target address associated with the subscription data, a group subscription identifier, or an individual subscription identifier;

generate a first request for subscription data retrieval using the subscription retrieval information, wherein the first request comprises an indication that the subscription data is stored in a subscription owner outside the mobile communication network;

transmit the first request to a unified data management in the mobile communication network;

receive a response message from the unified data management that contains subscription data for the UE; and complete a registration of the UE based at least in part on the subscription data, wherein the subscription data comprises at least one of the following for the UE: a mobility restriction, access and mobility ("AM") subscription data, slice selection subscription data, session management function ("SMF") selection subscription data, SMF management subscription data, or a combination thereof.

9. The AMF of claim 8, wherein the subscription retrieval information comprises at least one subscription retrieval parameter which is included in the first request for subscription data retrieval.

10. The AMF of claim 9, wherein the at least one subscription retrieval parameter comprises the access credential to access external subscription data, the credential provided by the subscription owner.

11. The AMF of claim 9, wherein the at least one subscription retrieval parameter comprises the target address associated with the subscription data.

12. The AMF of claim 11, wherein the target address comprises the external subscriber identifier.

13. The AMF of claim 9, wherein the subscription retrieval parameter comprises the group subscription identifier, and wherein the group subscription identifier corresponds to a class of subscribers.

14. The AMF of claim 9, wherein, to receive the subscription retrieval information, the at least one processor is configured to cause the AMF to receive the individual subscription identifier from the subscriber data management in the mobile communication network.

15. The AMF of claim 8, wherein the at least one processor is configured to cause the AMF to use the external subscriber identifier for security operations.

16. The AMF of claim 8, wherein the at least one processor is configured to cause the AMF to:

use the subscription retrieval information as a subscription identifier to identify the subscription for transactions within a serving network, and use the external subscriber identifier to identify the subscription for transactions outside the serving network.

17. The AMF of claim 16, wherein the at least one processor is configured to cause the AMF to transmit the subscription identifier to at least one network function for subscription retrieval within the serving network.

18. The UDM apparatus of claim 1, wherein the subscription owner comprises a service provider of the UE.

19. The UDM apparatus of claim 1, wherein to retrieve the subscription data from the subscription owner, the at least one processor is configured to cause the UDM apparatus to retrieve the subscription data from an Authentication, Authorization, and Accounting ("AAA") server of the subscription owner and wherein the subscription retrieval parameter comprises an AAA server identifier ("AAA-server ID").

20. The AMF of claim 8, wherein the at least one processor is further configured to cause the AMF to store the subscription data for the UE.

* * * * *